United States Patent [19]

Wood et al.

[11] Patent Number: 4,822,554
[45] Date of Patent: Apr. 18, 1989

[54] RECONSTITUTION AND REPAIR SYSTEM FOR NUCLEAR FUEL ROD ASSEMBLIES

[75] Inventors: John D. Wood, Hempfield Township, Westmoreland County; Alan Savinell, Penn Hills; Charles H. Roth, Jr., N. Huntingdon; Frederick J. Ellingson, Murrysville Boro; George F. Dailey, Plum Boro, all of Pa.

[73] Assignee: Westinghouse Electric Corp., Pittsburgh, Pa.

[21] Appl. No.: 916,682

[22] Filed: Oct. 8, 1986

[51] Int. Cl.⁴ .................. G21C 19/10; G21C 19/32
[52] U.S. Cl. ................................. 376/261; 376/271
[58] Field of Search ............... 376/261, 260, 262, 271, 376/268, 264; 29/723, 400 N, 402.06, 426.4; 414/146, 758, 761

[56] References Cited

U.S. PATENT DOCUMENTS

| | | | |
|---|---|---|---|
| 2,747,263 | 5/1956 | Green | 414/758 |
| 3,001,632 | 9/1961 | Bell | 414/761 |
| 3,894,327 | 7/1975 | Jabsen | 376/260 |
| 4,058,224 | 11/1977 | Jabsen | 376/260 |
| 4,175,000 | 11/1979 | Jabsen | 376/260 |
| 4,374,801 | 2/1983 | Albin | 376/271 |
| 4,522,780 | 6/1985 | Shallenberger et al. | 376/260 |
| 4,539,174 | 9/1985 | Patenaude | 376/261 |
| 4,551,299 | 11/1985 | Shields | 376/261 |
| 4,659,536 | 4/1987 | Baudro | 376/261 |
| 4,673,545 | 6/1987 | Cooke et al. | 376/261 |
| 4,687,245 | 8/1987 | Formanek | 376/261 |
| 4,717,531 | 1/1988 | Hardin, Jr. | 376/261 |
| 4,724,607 | 2/1988 | Beuneche et al. | 376/271 |
| 4,724,636 | 2/1988 | Tolino | 376/260 |
| 4,725,398 | 2/1988 | Ruckey et al. | 414/146 |

FOREIGN PATENT DOCUMENTS

| | | | |
|---|---|---|---|
| 8512898 | 8/1985 | France | 376/261 |
| 83/04454 | 6/1983 | World Int. Prop. O. | 376/261 |

OTHER PUBLICATIONS

"KWU Offers a Mobile Reconstitution Unit for PWR Fuel", Nuclear Engr. Int., 2/86.

Primary Examiner—Deborah L. Kyle
Assistant Examiner—Daniel Wasil

[57] ABSTRACT

An improved system for repairing and reconstituting a fuel rod assembly in the spent fuel pool of a nuclear power plant is disclosed herein. The improved system includes a height-adjustable elevator and carriage assembly for lifting and inverting a pair a fuel assemblies with their bottom ends adjacent one another, a length-adjustable rod handling tool having a gripper for gripping, lifting, lowering and ungripping a fuel rod, and a dual-axis tool positioner mountable over the bottom ends of the inverted, adjacent fuel assemblies. The tool positioner includes a funnel-shaped tool guide that is movable over the bottom ends of the fuel assemblies for receiving and positioning the gripper of the rod handling tool. The improved system may be adjusted for use in spent fuel pools of substantially different dimensions and water levels without the need for additional parts, and may be operated by only two technicians.

7 Claims, 18 Drawing Sheets

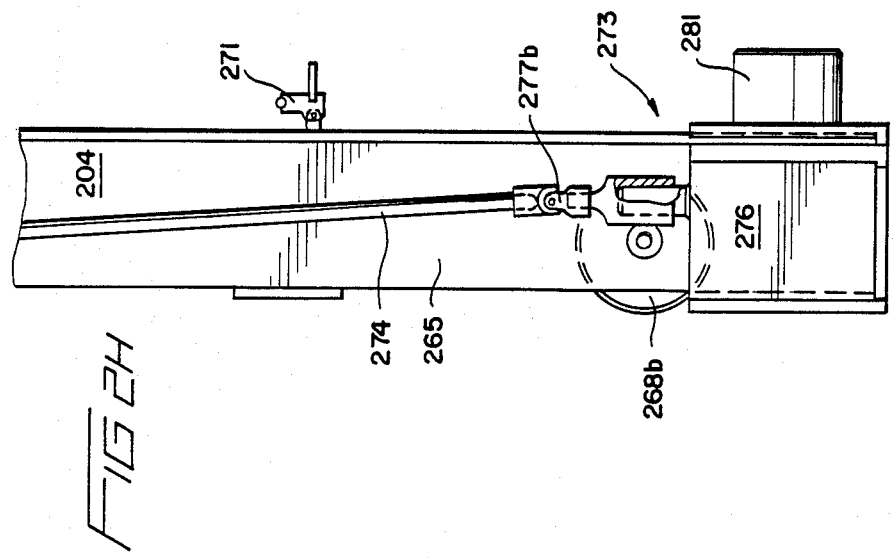
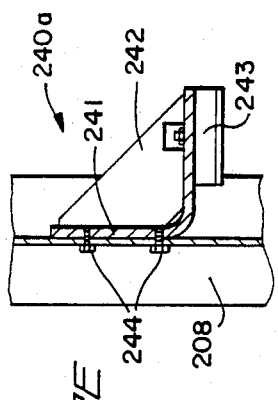
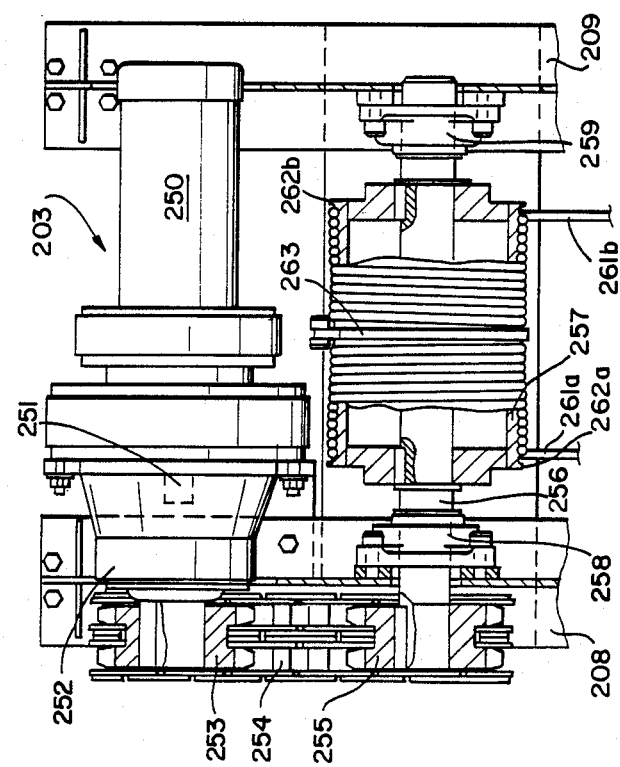

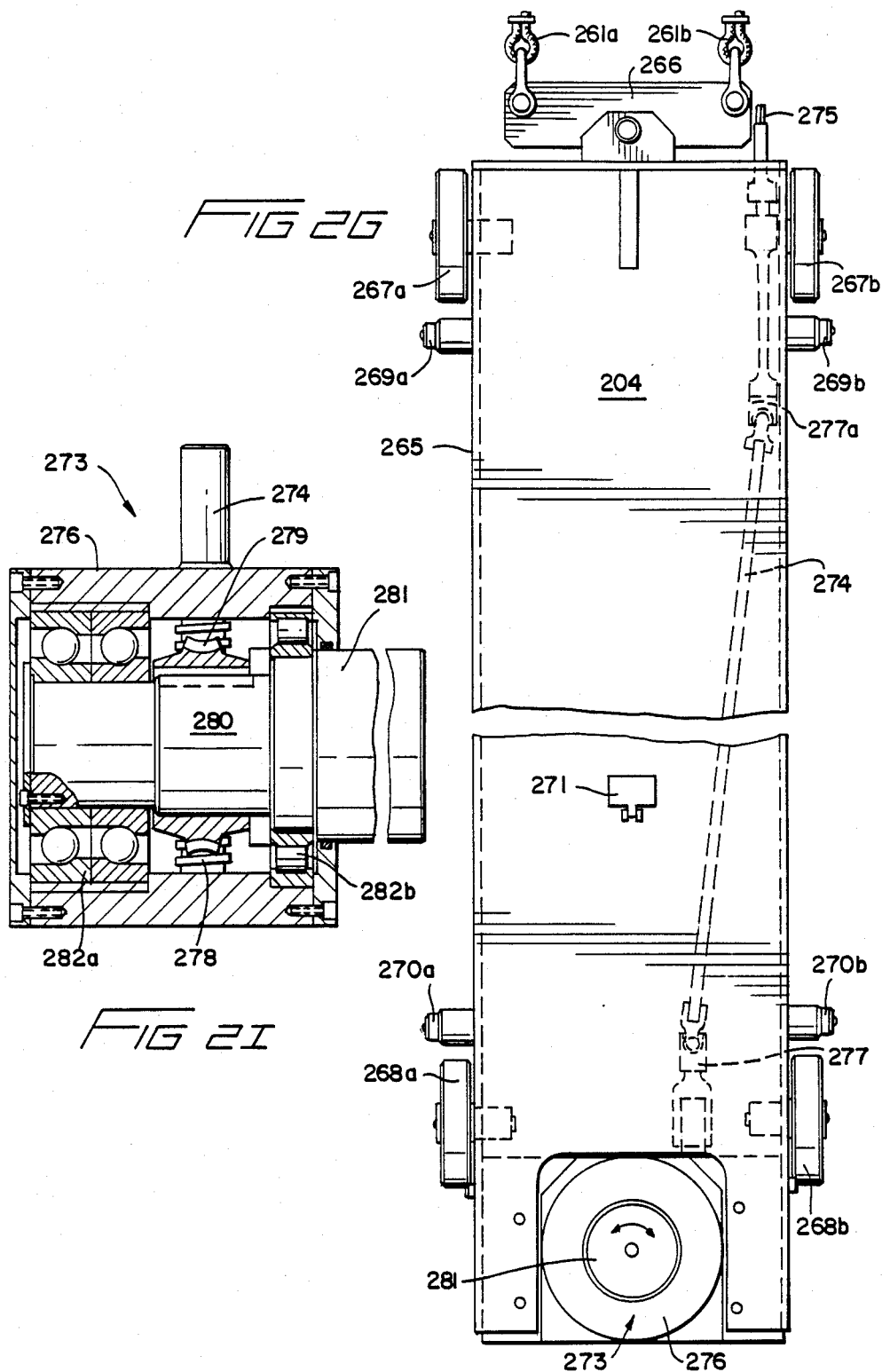

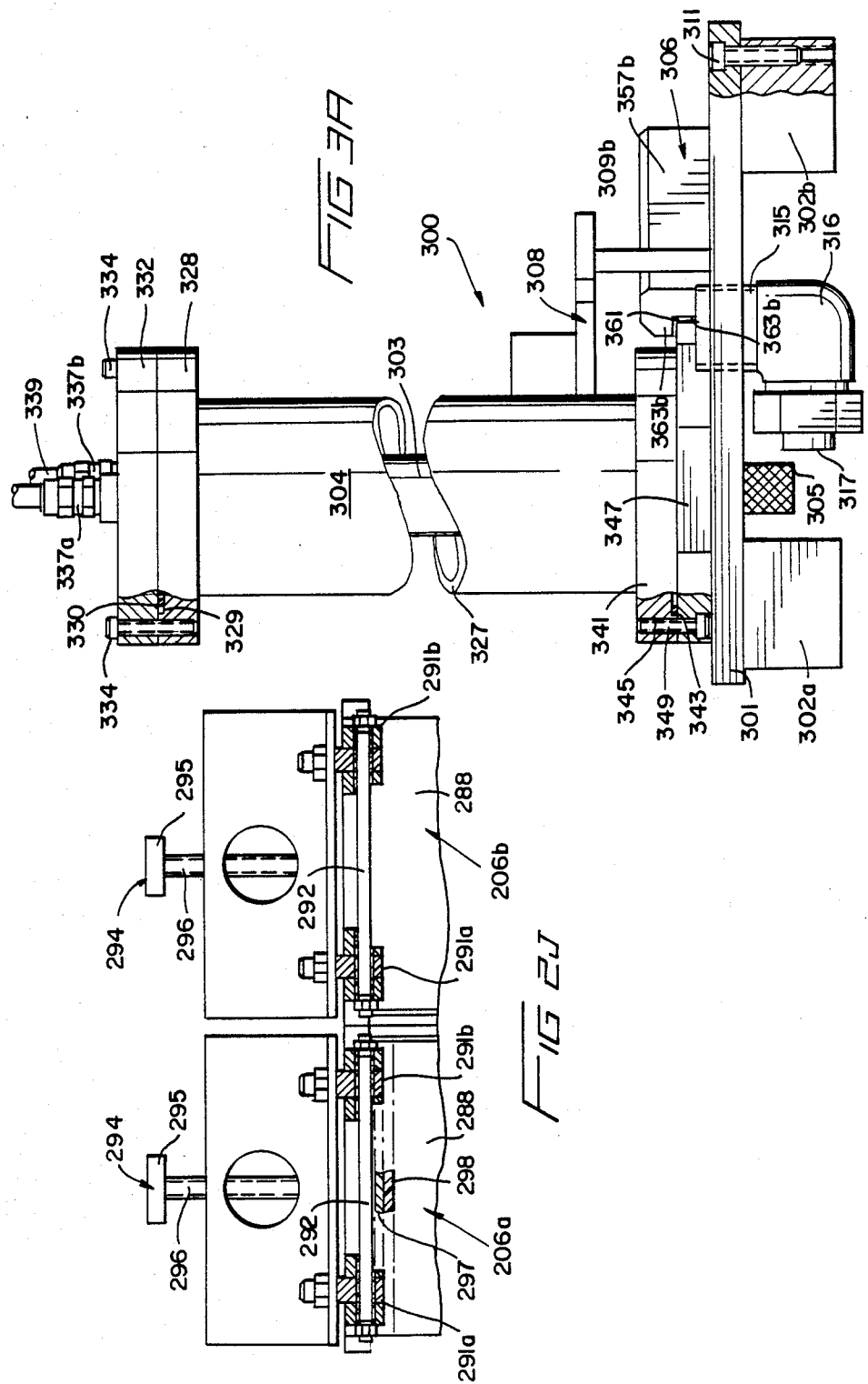

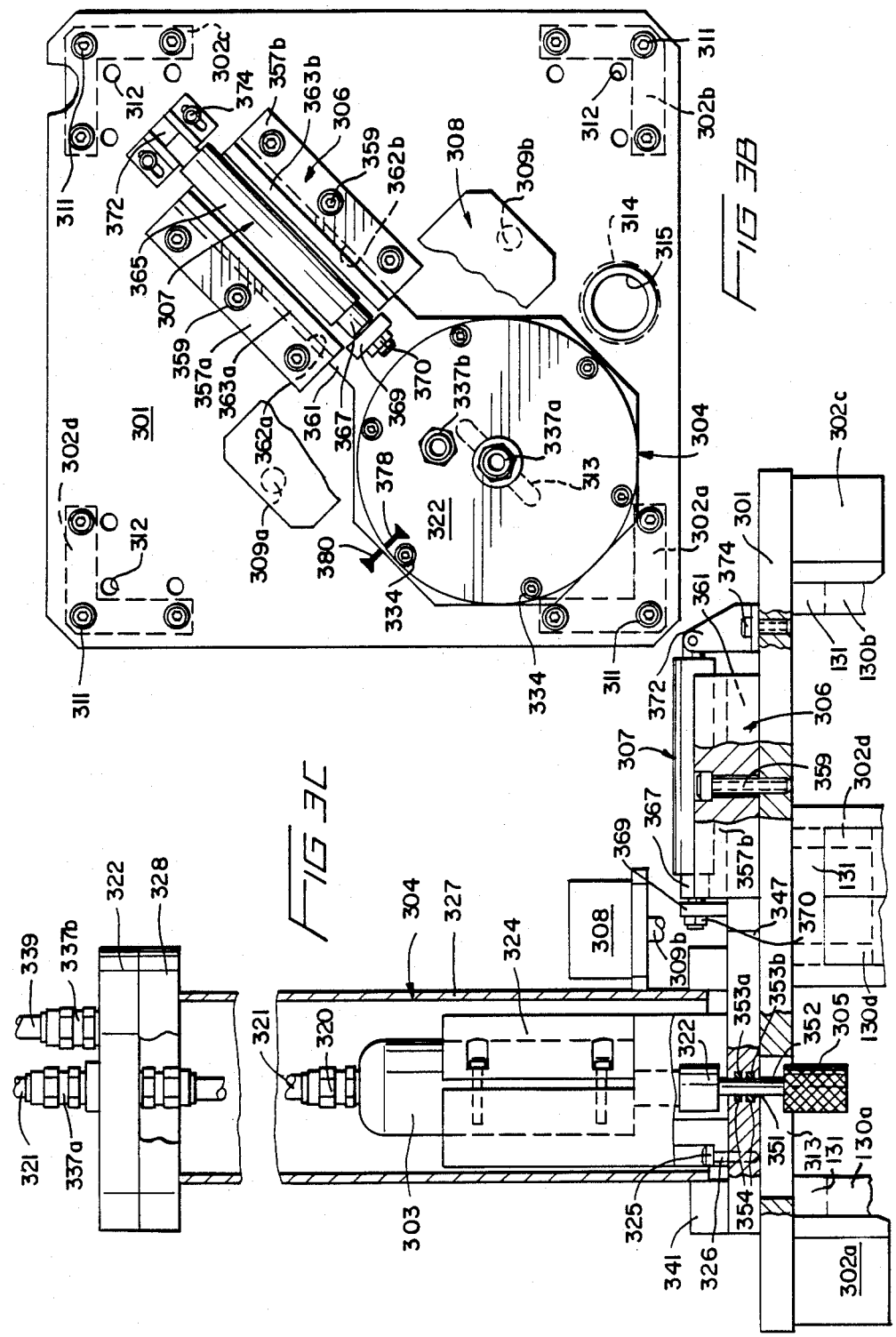

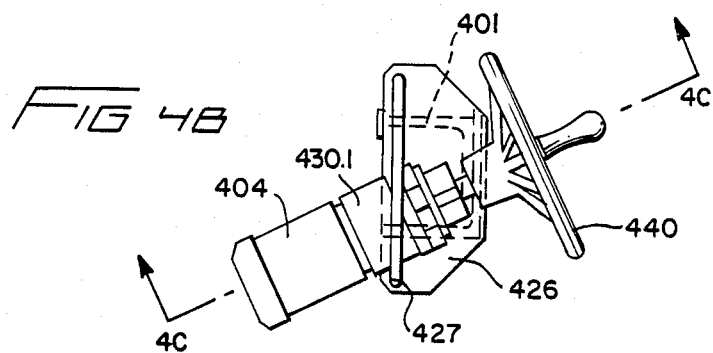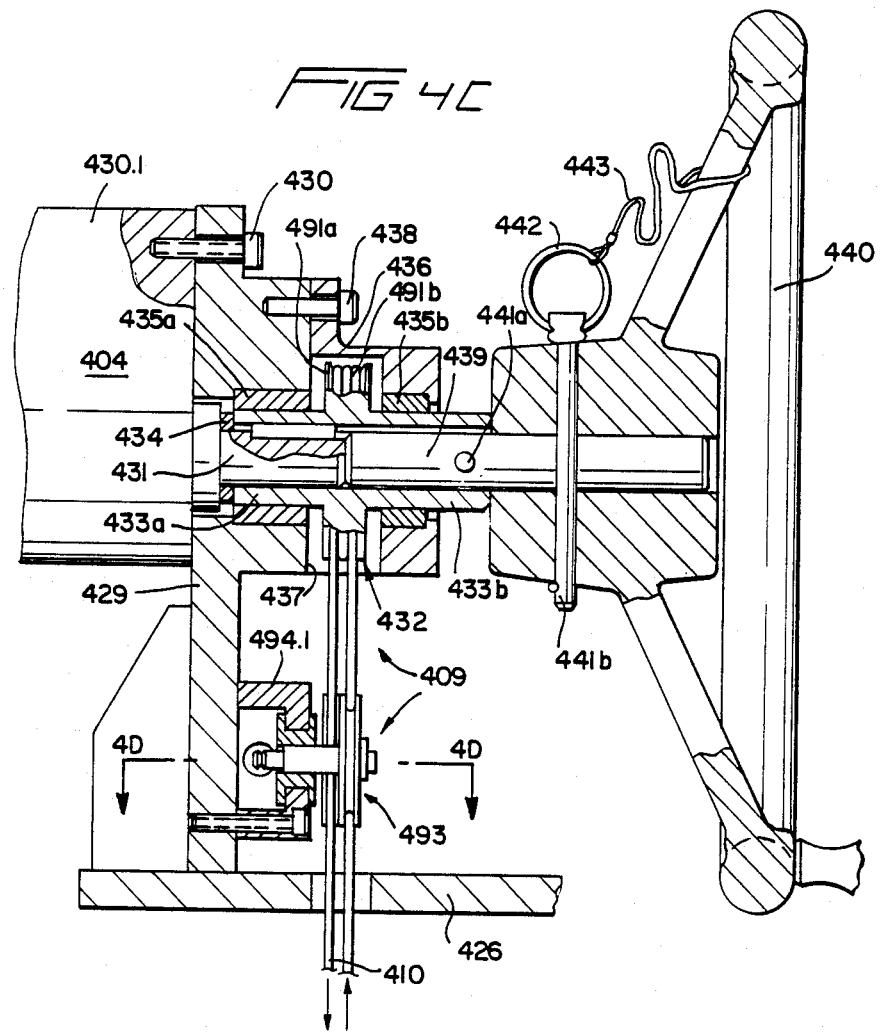

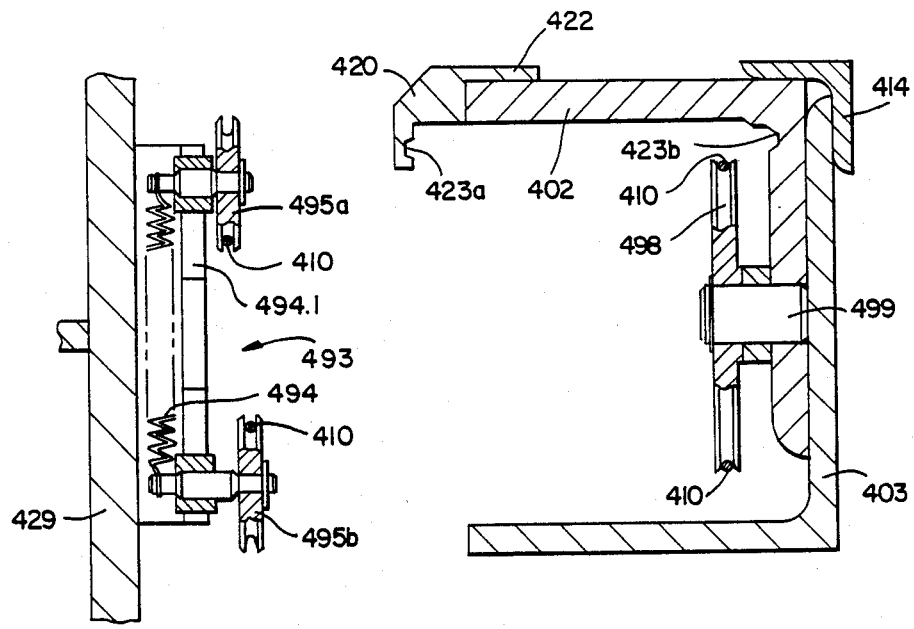
FIG 4D
FIG 4E
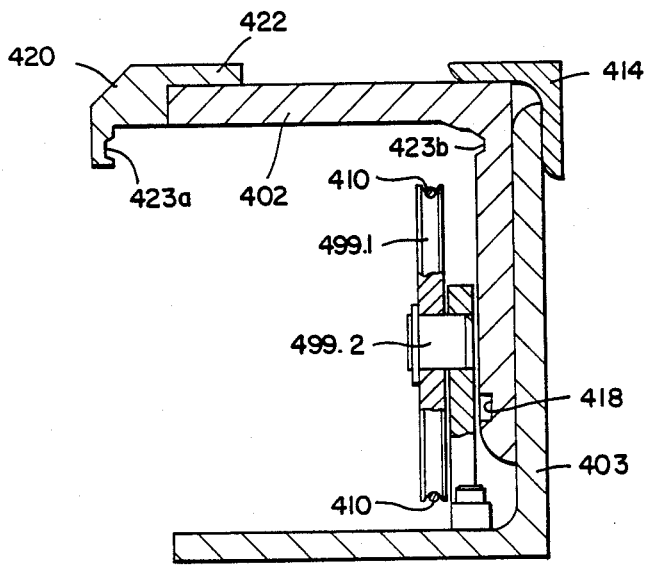
FIG 4F

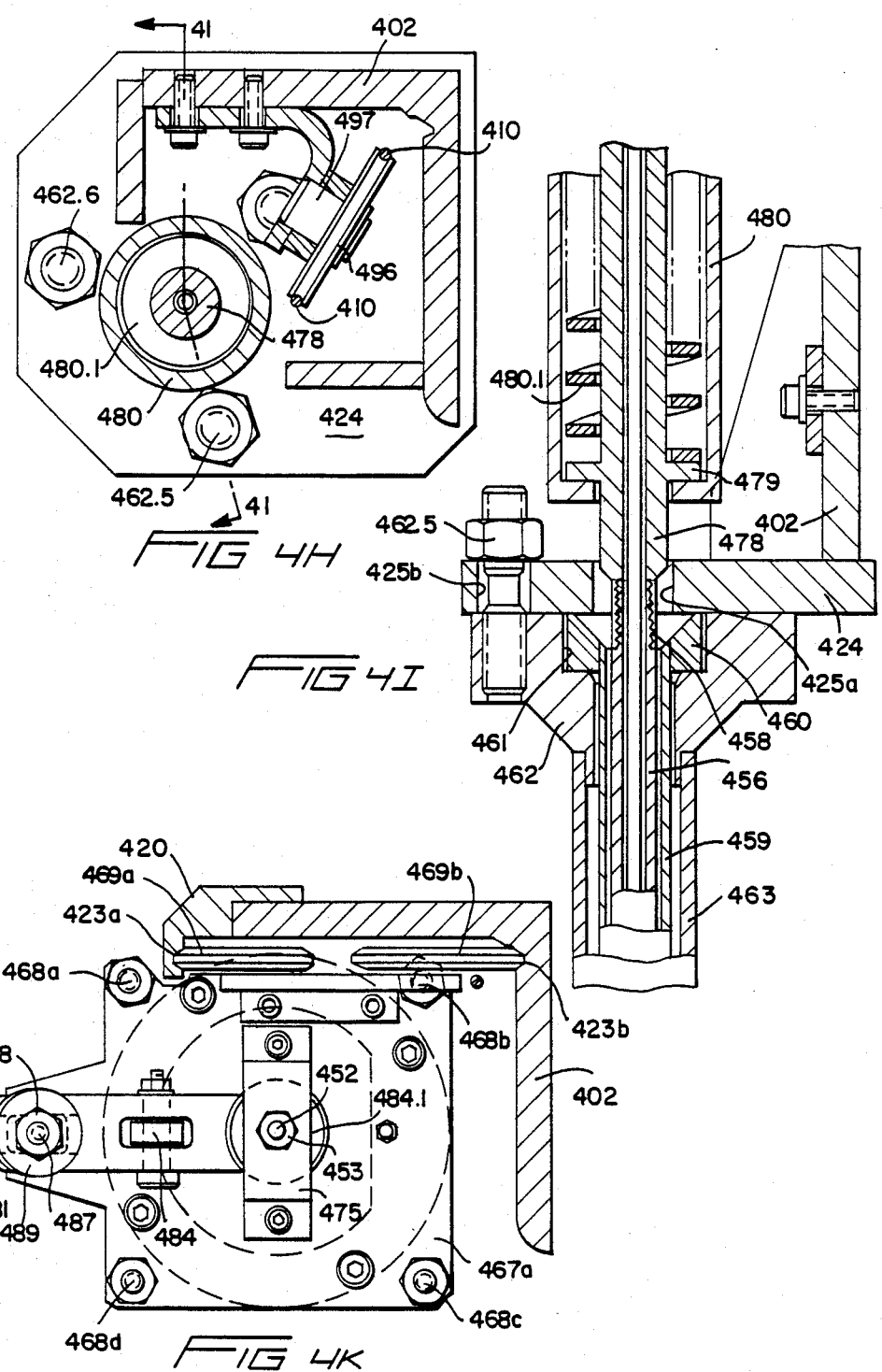

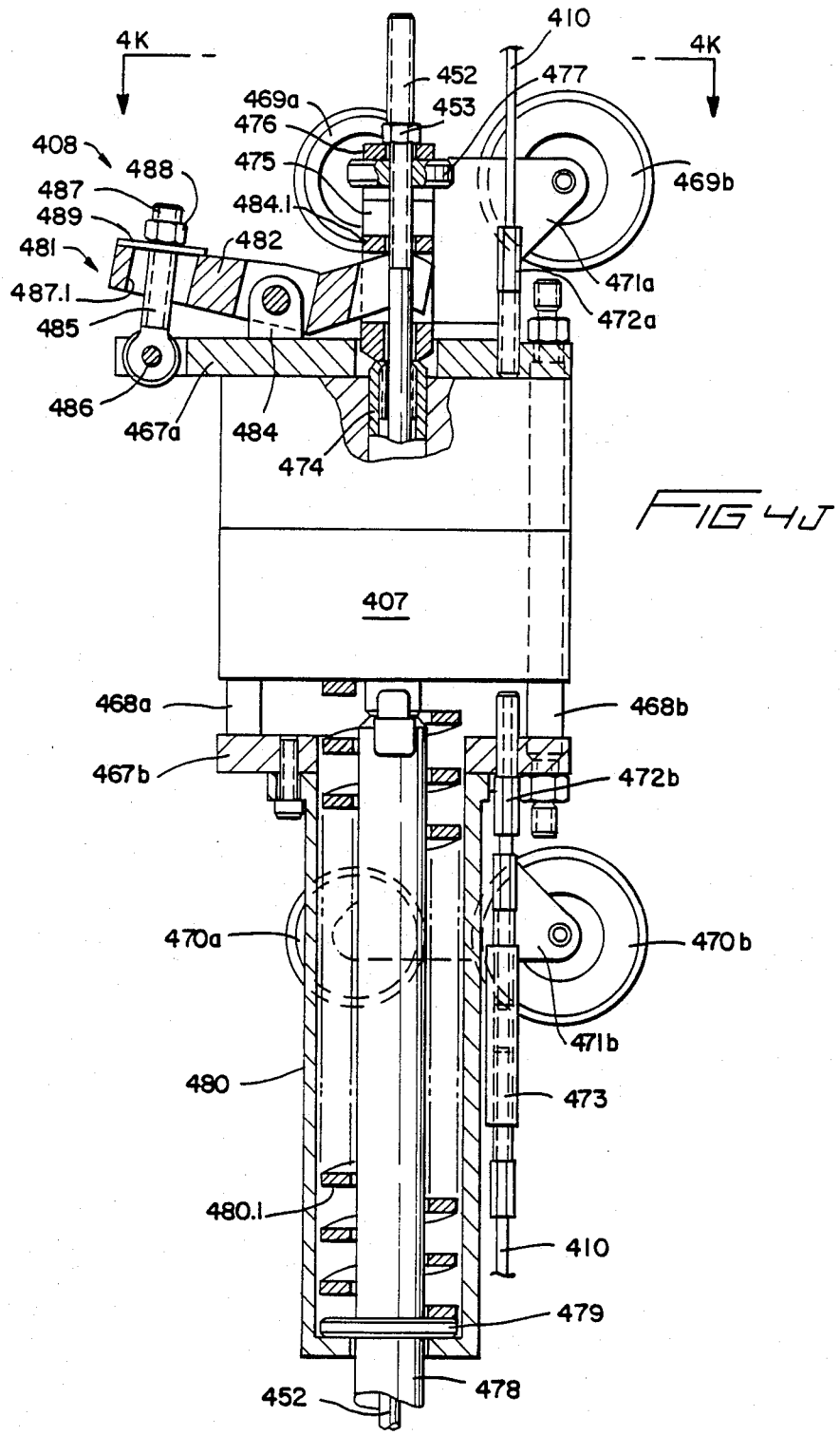

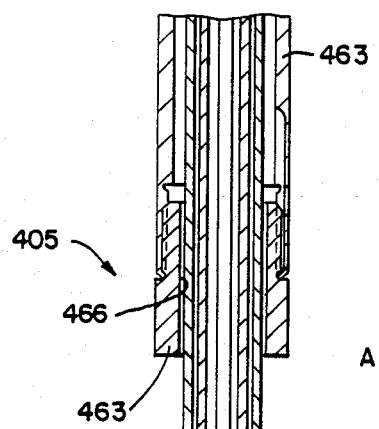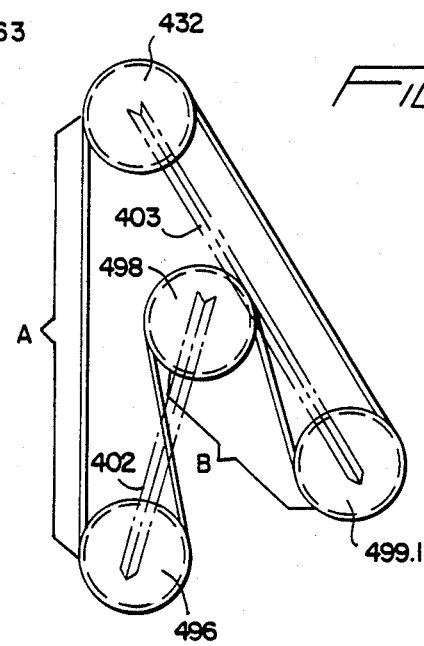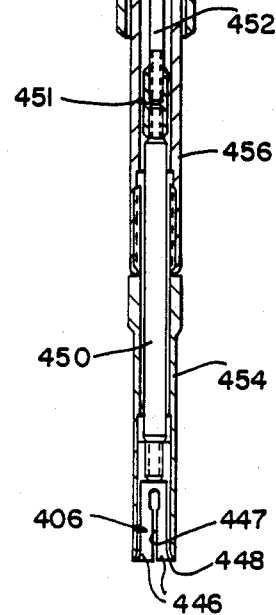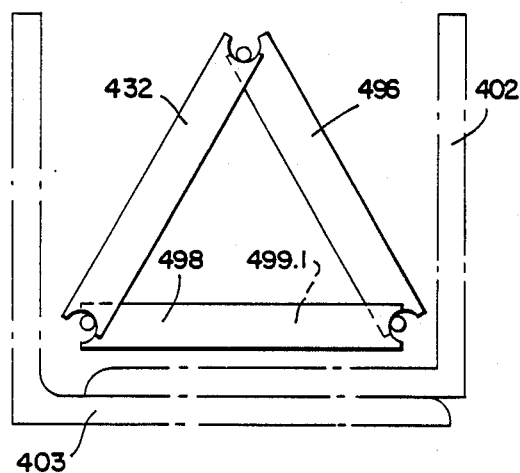

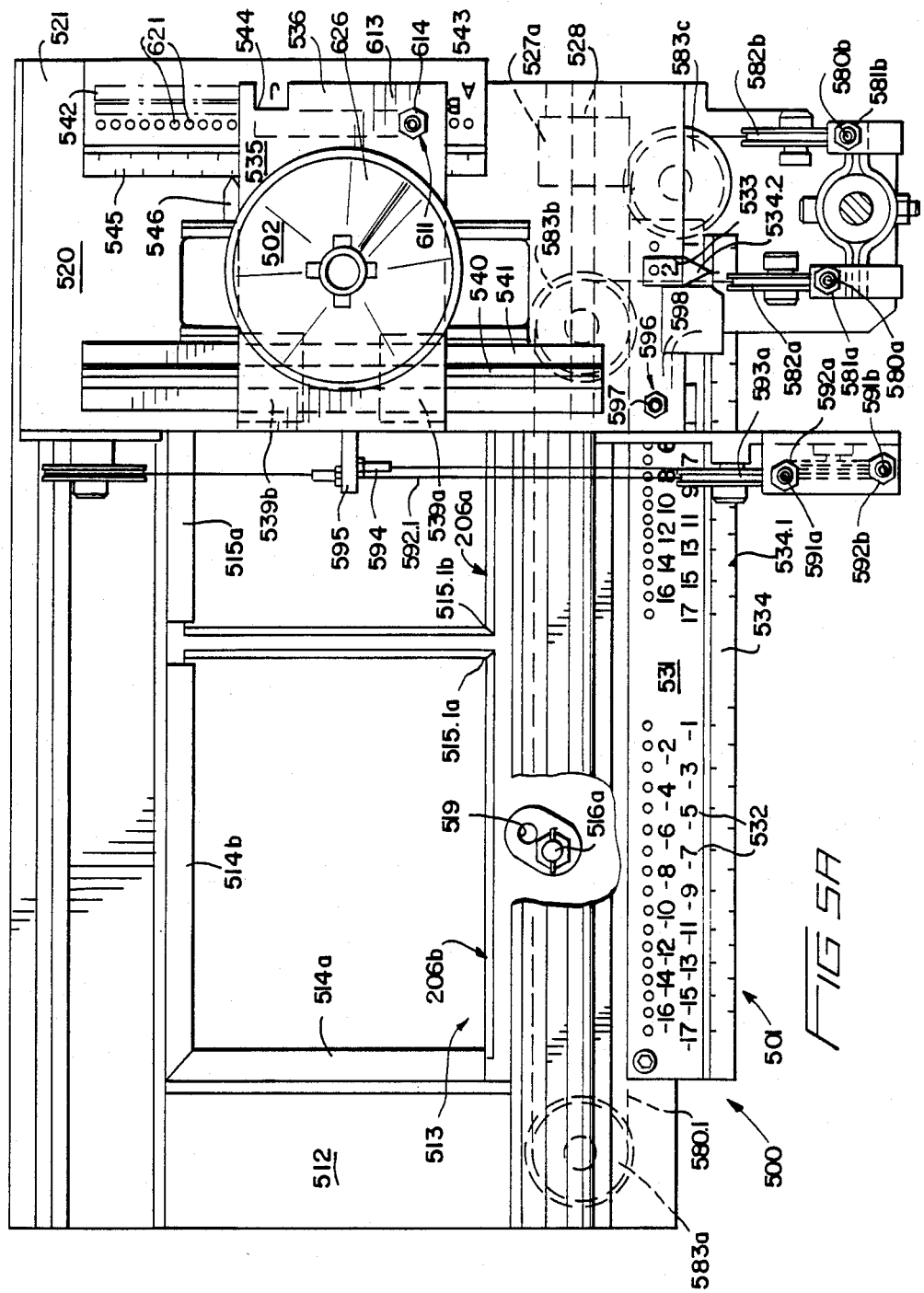

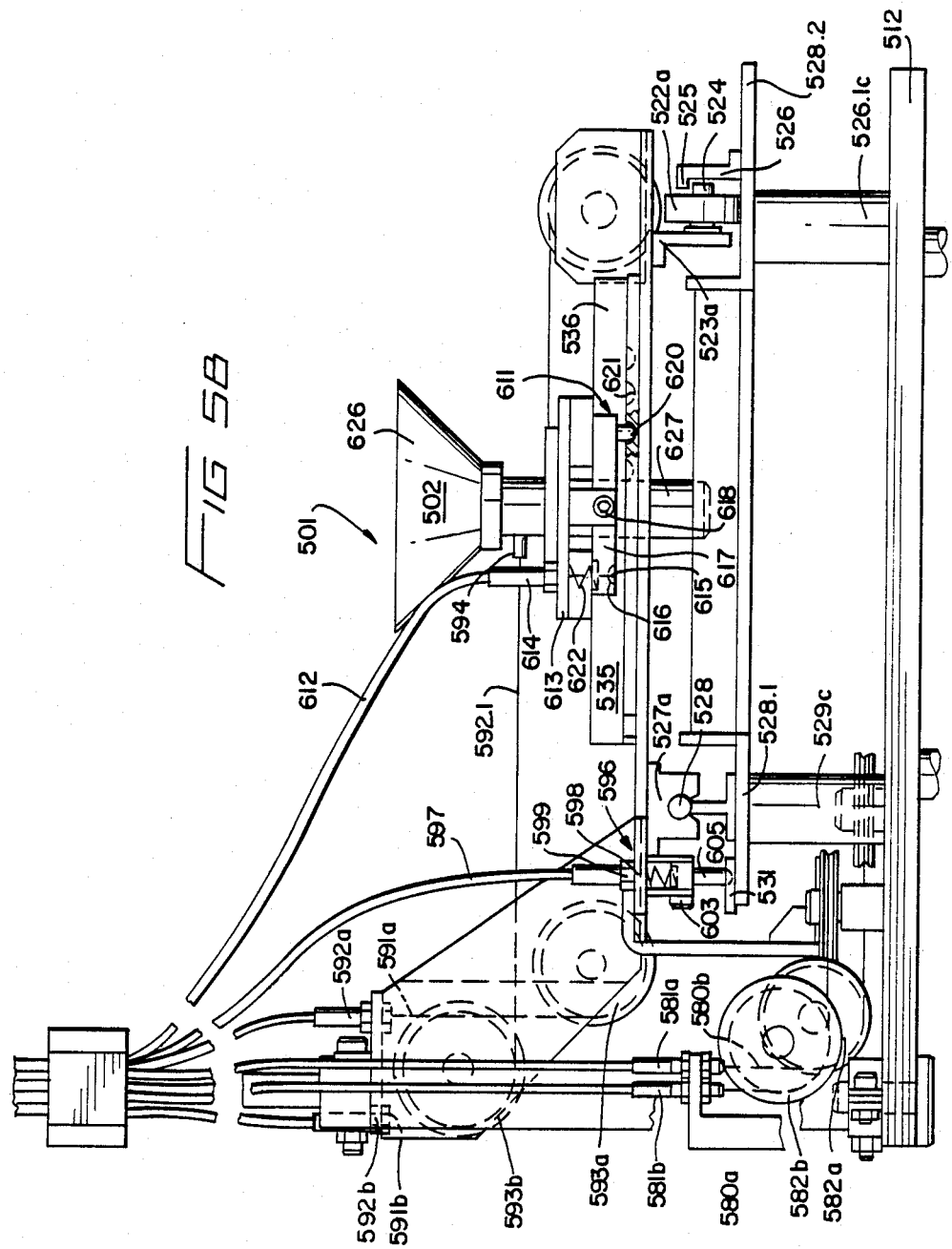

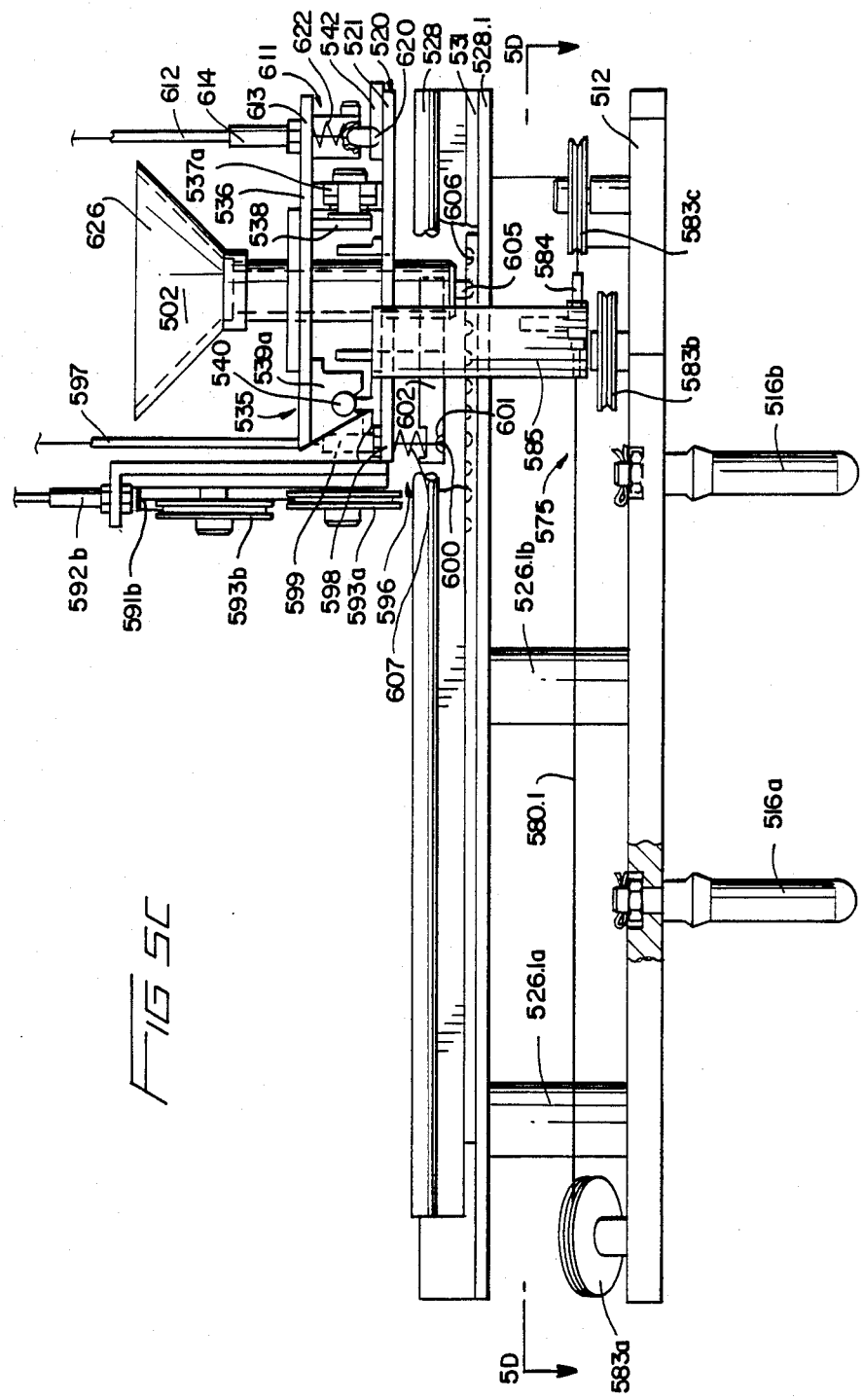

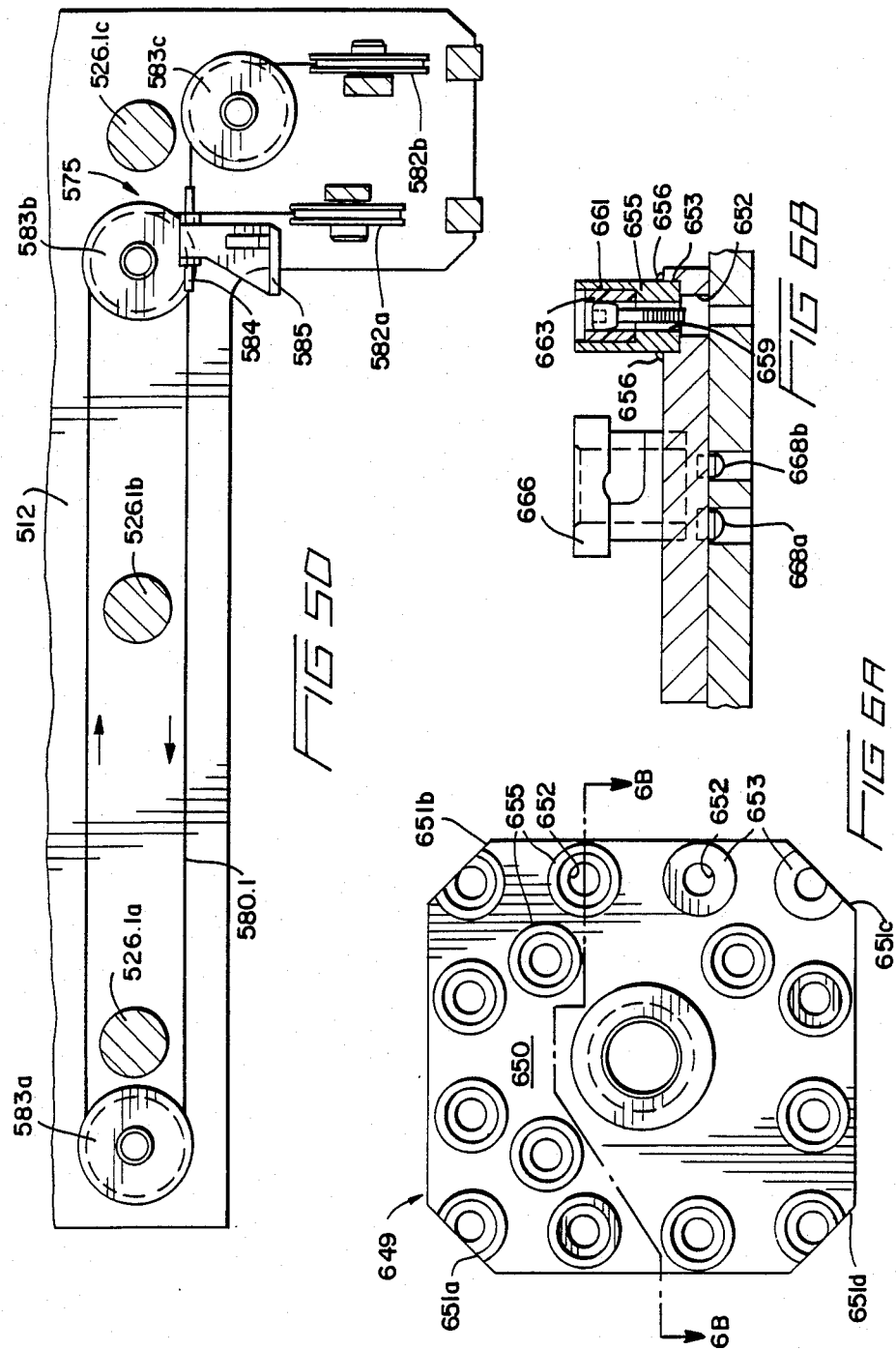

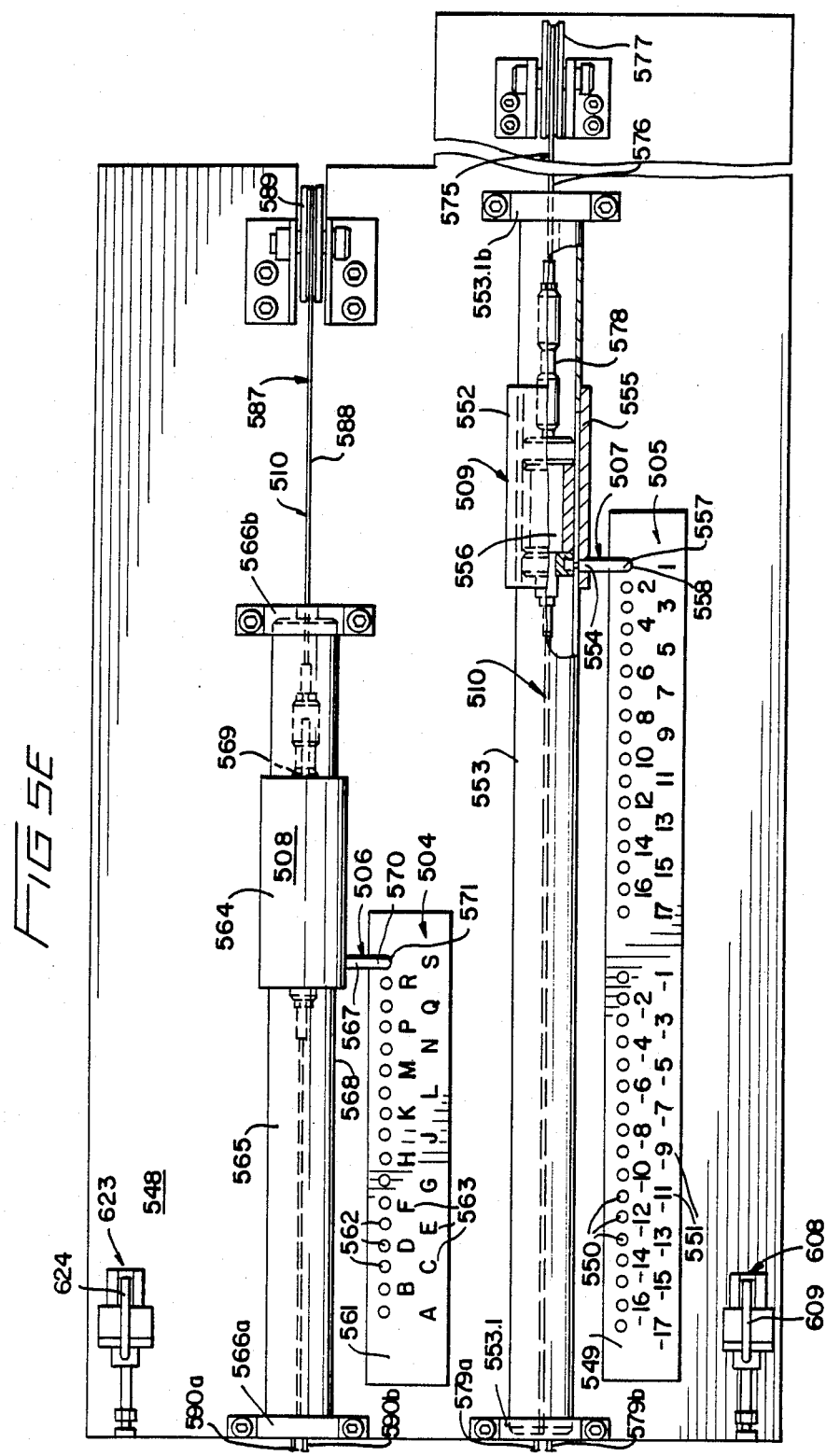

RECONSTITUTION AND REPAIR SYSTEM FOR NUCLEAR FUEL ROD ASSEMBLIES

BACKGROUND OF THE INVENTION

1. Field of the Invention

The invention generally relates to a system for remotely repairing or reconstituting nuclear fuel rod assemblies in the spent fuel pool of a nuclear power plant. The system may be installed and operated in spent fuel pools of widely varying dimensions and water levels, and is capable of repairing and reconstituting all different sizes and types of fuel rod assemblies.

2. Description of the Prior Art

Tools for repairing the fuel rod assemblies used in nuclear power plants are known in the prior art. Such tools may be used to either reconstitute a fuel rod assembly having damaged fuel rods, or to reassemble a fuel assembly having a damaged support skeleton. In reconstitution-type repairs, only the defective fuel rods from the undamaged support skeleton are pulled and replaced with new fuel rods. In reassembly-type repairs, all of the undamaged fuel rods are removed from the damaged support skeleton and inserted into a new, undamaged skeleton. In order to implement these two types of repair operations, both manual and computer-operated tooling systems have been developed for individually gripping, lifting, lowering, and ungripping specific fuel rods from one support skeleton to another.

Unfortunately, the use of such tools is not without shortcomings. However, before these shortcomings may be fully appreciated, some brief background as to the structure, operation and environment of such fuel rod assemblies is necessary.

Nuclear fuel rod assemblies generally comprise between two hundred and two-hundred-and-ninety fuel rods mounted in a square array within a support skeleton. The support skeleton in turn is formed from bottom and top nozzles which are interconnected to one another by twenty-four uniformly arrayed thimble tubes. The bottom and top nozzles are eight to nine inches square, and the thimble tubes are about thirteen feet long, so that the overall shape of the fuel assembly is that of an elongated, rectangular prism (see FIG. 1). The fuel rods themselves are about twelve feet long. In order to equidistantly space the long and relatively flimsy fuel rods within the support skeleton, the skeleton includes approximately seven grids, each of which has a square array of open cells for receiving and spacing the fuel rods. The grids are usually formed from flat plates of interlocking sheet metal in an "egg crate" configuration which lends compressive strength to the grids with a minimum of weight. In operation, an array of fuel rod assemblies is lowered into the reactor core by a crane, the control rods of the fuel assemblies are removed, and a jet of pressurized water is guided through the bottom nozzles thereof in order to uniformly absorb the heat generated by the rods. Typically, the velocity of the pressurized water forced through the bottom nozzles of the fuel structures is on the order of fifteen feet per second.

In some nuclear cores, this fifteen feet per second flow of water has created pressure differentials which in turn have resulted in side currents that flow laterally through the fuel rod assemblies disposed in the core. These side currents sometimes produce vibrations in the fuel rods which can eventually weaken and break the rods through a fretting action. Additionally, the support skeletons that hold the fuel rods can become damaged as a result of routine handling of the fuel assemblies.

In order to repair such damaged fuel rod assemblies, the damaged assembly is typically lowered into the cask-loading area (or shaft) of the spent fuel pool of the nuclear plant. The cask-loading shaft is approximately forty feet long, and filled with water in order to shield workers (who typically stand on a deck located over the shaft) from radiation.

In manual reconstitution or repair operations, the workers on the deck over the cask-loading shaft use elongated hand tools capable of gripping and withdrawing a single rod out of the fuel assembly standing on the bottom of the shaft after the top nozzle has been cut and removed therefrom. Small television cameras are often mounted on these tools so that the workers may visually position them over a particular fuel rod. While such tools are capable of gripping, lifting, lowering and ungripping either damaged or undamaged fuel rods within a support skeleton, they are also long and flimsy, and hence slow and cumbersome to use. While the water in the cask-loading shaft does afford an effective shield for the majority of radiation emanating from the fuel rod assembly being repaired, the workers positioned on the deck still receive some amount of potentially hazardous radiation largely due to the length of time necessary to complete such a completely manual repair or reconstitution operation.

In order to solve the problems associated with such manual repair and reconstitution tools, a computer-controlled repair and reconstitution system was developed by the Westinghouse Electric Corporation. This system is described and claimed in U.S. patent application Ser. No. 746,897 filed June 20, 1985, by Anoop Kapoor et al. and assigned to the Westinghouse Elevator Company, the entire specification of which is incorporated herein by reference. While this system represents a substantial advance in the art and solved many of the problems associated with the previously described manual tooling systems, it, too, is not without certain limitations. For example, this particular system is complicated, and requires at least four technicians in order to be operated. Additionally, this particular system is not easily adaptable to fuel pools of different heights and water levels. Finally, this system requires a substantial number of parts which must be manufactured and assembled to within close tolerances.

Clearly, there is a need for an improved fuel reconstitution and repair system that is simpler and less expensive to manufacture, install and operate than prior art systems. Ideally, the components of such a system should be adjustable to accommodate the different sizes and water levels of different spent fuel pools, and operable by only a very few technicians in order to minimize the cost of operation. Finally, it would be desirable if such a system were easily transported, assembled and installed on various sites, highly reliable, and fast in operation so as to minimize the amount of radiation exposure the system operators receive.

SUMMARY OF THE INVENTION

Generally speaking, the invention is an improved system and method for repairing and reconstituting fuel assemblies submerged in a spent fuel pool that better fulfills the aforementioned needs of the industry. The improved system generally comprises a height-adjustable elevator and carriage assembly for lifting and inverting a pair of fuel assemblies with their bottom ends adjacent one another, a length-adjustable rod handling tool having a gripper for gripping, lifting, lowering, and ungripping a fuel rod, and a dual-axis tool positioner mountable over the bottom ends of the inverted, adjacent fuel assemblies. The elevator and carriage assembly of the system allows the system operators to place the fuel assemblies at the most ergonomically desirable height and angular orientation, which in turn allows them to perform the repair or reconstitution operation comfortably, safely and efficiently. The tool positioner advantageously positions the gripper of the rod handling tool over a rod location by manipulating only the lightweight, distal end of the rod handling tool. To this end, the positioning tool includes a tool guide that is movable over the adjacent ends of the fuel assemblies. The improved system may be used in spent fuel pools of substantially different dimensions and water levels without the replacement of any structural components, is simple in structure, relatively lightweight, easy to install, and may be operated by only two technicians. Moreover, the rapid rate of operation of the system minimizes radiation exposure to the operator personnel.

The elevator and carriage assembly may include an elongated frame, a pair of baskets for carrying and supporting a pair of fuel assemblies in side-by-side arrangement, an elevator assembly having a carriage drive for positioning the baskets at a selected point along the longitudinal axis of the frame, and a basket inverting assembly. The basket inverting assembly may have a mounting means for rotatably mounting the baskets to the elevator, and a drive means for selectively rotating the baskets around the mounting means.

The elongated frame is preferably height adjustable so that the apparatus may be installed in spent fuel pools of different dimensions and water levels without submerging the carriage drive. Additionally, each basket preferably includes a detachably connectable cap at each end for admitting a fuel assembly within the basket at either end thereof, and for providing access to the fuel assembly regardless of whether the basket is in an inverted or a non-inverted orientation. One of the caps of each of the baskets may include a clamp for axially clamping the fuel assembly contained within in order to prevent the fuel assembly from sliding during an inversion operation.

The frame of the apparatus may include upper and lower stops for confining the movement of the carriage of the elevator assembly between two select points along the longitudinal axis of the frame. The upper stops prevent the elevator assembly from lifting a fuel assembly to a height that does not leave a sufficient amount of radiation-shielding water between the fuel assembly and the system operators. The lower stops ensure that, in the case of a failure of the elevator assembly, the fuel assemblies in the baskets will not fall to the floor of the spent fuel pool. The frame may either include a base plate for standing the frame on the floor of a spent fuel pool, or means for hanging the frame over the side of the pool.

The rod handling tool may comprise a length-adjustable housing with the previously mentioned gripper mounted on the distal end thereof, a lift motor mounted on the proximal end of the housing for lifting and lowering the gripper, and a length-adjustable linkage for connecting the lift motor to the gripper that automatically adjusts its length to accommodate adjustments in the length of the housing. The automatic length adjustability of the linkage allows the length of the housing of the tool to be adjusted to accommodate different water levels of different spent fuel pools without the need for replacing or modifying any of the linkage elements between the lift motor and the gripper.

The length-adjustable housing is preferably formed from a stationary outer leg, and an inner leg that is slidably movable within and securable with the outer leg. The length-adjustable linkage may include a drive pulley connected to the output shaft of the lift motor, a plurality of idler pulleys, and a loop of cable whose length remains constant despite adjustments in the length of the housing. The pulley assembly may in turn include three idler pulleys, the first and second of which are rotatably mounted on the inner leg, and the third of which is rotatably mounted on the outer leg somewhere between the first and second pulleys with respect to the longitudinal axis of the housing.

To minimize the width of the pulley assembly, the pulleys may be arranged in a non-coplanar configuration wherein the second and third idler pulleys rotate in a first plane, and the drive pulley and first idler pulley rotate in second and third planes, respectively. In the preferred embodiment, the first, second, and third planes are mutually disposed 60° from one another in a triangular configuration.

The rod handling tool of the invention provides a means for gripping, lifting, unlifting, and ungripping a selected fuel rod of a fuel rod assembly having a structure that is simple, lightweight, and completely height adjustable.

The dual-axis tool positioner for positioning the rod handling tool generally comprises a master carriage assembly having a master index with points corresponding to locations of various rod members in the rod array, and a master indicator that is movable over the points of the master index. The mechanism further includes a slave carriage assembly detachably mountable over the rod array for moving the aforementioned tool guide over a selected one of the rods, and a linkage connecting the master indicator to the tool guide for translating the movement of the master indicator over a point of the master index to a movement of the tool guide over a corresponding fuel rod location.

The slave carriage assembly of the positioning mechanism may include a support frame, and first and second slave carriages movable along orthogonal Y and X axes of the support frame. In the preferred embodiment, the slave carriage assembly further includes an alignment wedge for automatically aligning the first and second carriages with the rod array when the slave carriage is detachably mounted over the array.

The master carriage assembly may include a support frame, and first and second hand-operated drivers connected to the master indicator that are slidably movable over the support frame for operating the first and second slave carriages. In the preferred embodiment, the linkage of the mechanism includes first and second loops of cable that mechanically link the first hand-operated driver with the Y axis carriage, and the second hand-operated driver with the X axis carriage. Additionally, the linkage of the positioning mechanism may include a lock means for locking the position of both the Y and X axis slave carriages.

The tool guide moved by the Y and X axis slave carriages may include a guide sleeve for receiving and guiding the distal end of the gripper of the rod handling tool, as well as a funnel for loading the gripper into the guide sleeve when the two tools are engaged to one another. The dual-axis tool positioner provides a simple, reliable mechanical system that quickly and accurately positions the gripper of the rod handling tool from a selected rod location in one fuel assembly to a selected rod location in an adjacent fuel assembly.

In the method of the invention, the elevator and carriage assembly is used to position a pair of fuel rod assemblies at a convenient level within the spent fuel pool with their ends side-by-side. The nozzles on the upper ends of the fuel assemblies are then removed Depending upon the type and model of fuel rod assemblies being repaired or reconstituted, this may be either the top or bottom nozzle. The basket inverter makes either nozzle equally accessible. After the nozzles on the upper ends of the fuel assemblies are removed, the dual-axis positioning tool is installed over the open ends of the assemblies. The gripper of the rod handling tool is then inserted into the tool guide. The positioner moves the gripper back and forth between rod locations in the two fuel assemblies as the gripper transfers fuel rods therebetween. After the repair or reconstitution operation is completed, the tool positioner and rod handling tool are removed, and new nozzles are secured onto the open ends of the fuel assemblies.

BRIEF DESCRIPTION OF THE SEVERAL FIGURES

FIG. 2E is an enlargement of the area surrounded by the dotted circle in FIG. 2B, showing the details of an upper stop on the frame of the elevator and carriage system;

FIG. 2F is a front, partial cross-sectional view of the carriage drive of the elevator assembly;

FIG. 2G is a front view of the carriage of the elevator assembly;

FIG. 2H is a cross-sectional side view of the carriage illustrated in FIG. 2G;

FIG. 2I is a partial cross-sectional side view of the gearbox of the basket inverter mounted on the carriage of the elevator assembly, and FIG. 2J illustrates the top caps of the baskets, showing in particular the axial clamps included in these caps, and the hinges upon which they pivot.

FIG. 3A is a partial cross-sectional side view of the grinding tool of the system;

FIG. 3B is a top, plan view of this grinding tool;

FIG. 3C is a second cross-sectional side view of this grinder, showing the grinding tool disposed over the feet of an inverted bottom nozzle.

FIG. 4B is a top, plan view of the rod-handling tool illustrated in FIG. 4A;

FIG. 4C is a cross-sectional side view of the top portion of the rod-handling tool along the line 4C—4C in FIG. 4B;

FIG. 4D is a plan, cross-sectional view of the upper portion of the tool illustrated in FIG. 4C along the line 4D—4D, illustrating the cable tensioner used in the fuel rod handler;

FIG. 4E is a cross-sectional view of the housing of the rod-handling tool along the line 4E—4E in FIG. 4A, illustrating one of the idler pulleys used in the linkage of the tool;

FIG. 4F is a cross-sectional view of the housing of the tool along the line 4F—4F in FIG. 4A, illustrating still another of the idler pulleys used in the linkage of the tool;

FIG. 4H is a cross-sectional view of the housing of the tool along the line 4H—4H in FIG. 4A, illustrating still another of the idler pulleys used in the linkage of the tool;

FIG. 4I is a cross-sectional view of the section of the housing illustrated in FIG. 4H along the line 4I—4I, illustrating both the bottom plate of the housing, the coupling that holds the inner and outer rod sheaths to this housing, as well as the spring well of the cylinder carriage of the tool;

FIG. 4J is a partial cross-sectional side view of the cylinder carriage of the tool;

FIG. 4K is a top, plan view of the cylinder carriage illustrated in FIG. 4J;

FIG. 4L is an enlarged, cross-sectional view of the portion of the rod-handling tool that is circled in FIG. 4A, showing the rod-gripping mechanism of this tool;

FIG. 4M is a schematic diagram of the pulley arrangement used to connect the lift motor of the tool with the cylinder carriage; and FIG. 4N is a schematicized top plan view of this pulley arrangement, illustrating the compact, spacesaving arrangement of these pulleys.

FIG. 5A is a top view of the X-Y positioner that positions the rod-handling tool of the system over a particular grid in a fuel rod assembly;

FIG. 5B is a partial side, cross-sectional side view of the positioner illustrated in FIG. 5A;

FIG. 5C is another partial side, cross-sectional view of this positioner taken along a different side;

FIG. 5D is a partial view of the Y axis linkage between the Y axis hand driver on the master carriage assembly, and the Y axis slave carriage on the slave carriage assembly; and FIG. 5E is a plan view of the master carriage assembly of the X-Y positioner.

FIG. 6A is a top, plan view of the pull-screw guide plate used in the system, and FIG. 6B is a partial side, cross-sectional view of the plate illustrated in FIG. 6A.

DETAILED DESCRIPTION OF THE PREFERRED EMBODIMENT

General Overview of the Purpose, Structure and Method of the System

Figure 1:
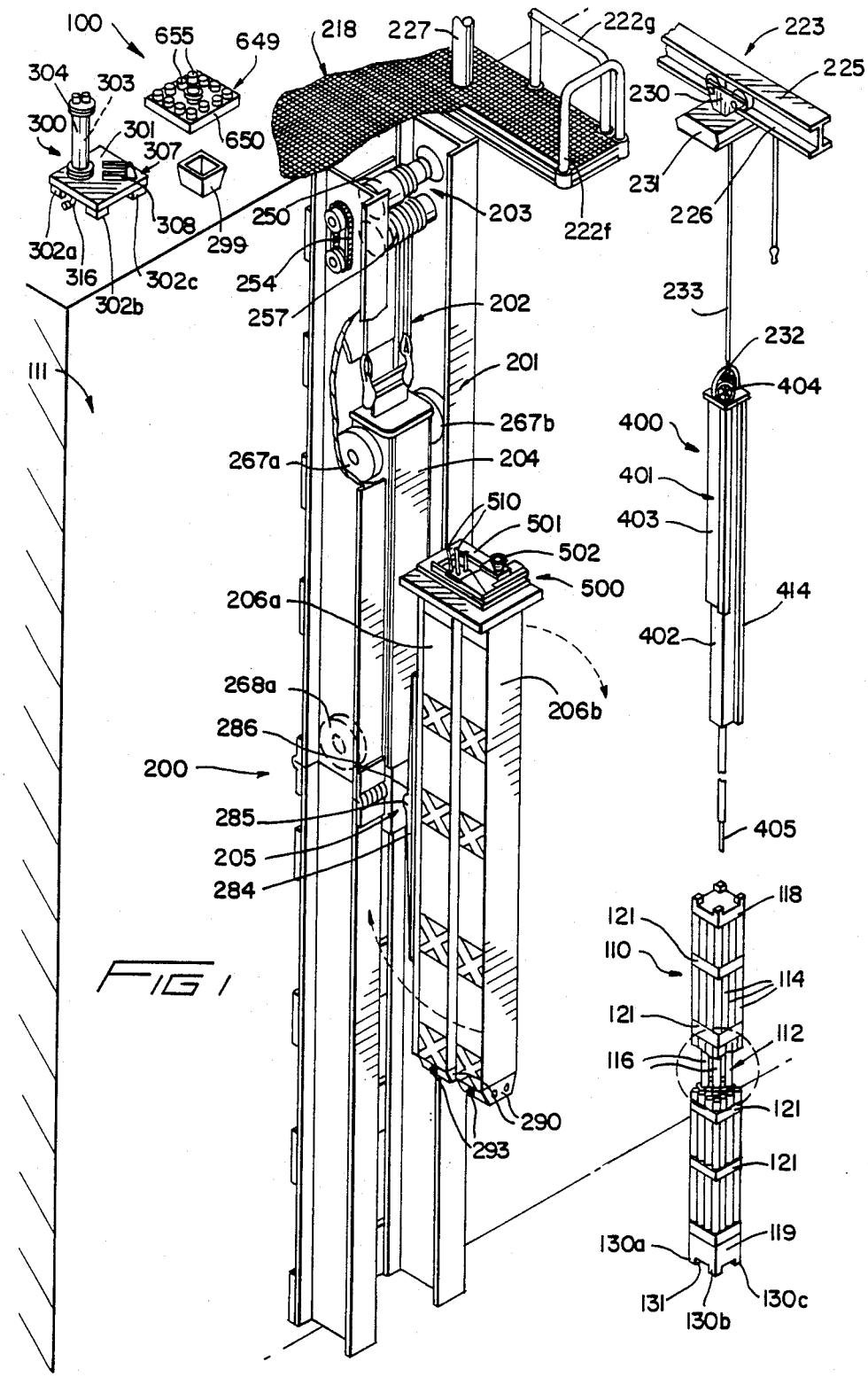
FIG. 1 is a perspective view of the repair and reconstitution system of the invention, showing all the major components thereof.

With reference to FIG. 1, the purpose of the improved system 100 of the invention is to repair or to reconstitute fuel rod assemblies 110 in the spent fuel pool 111 of a nuclear power facility.

The fuel rod assemblies 110 used in such plants are generally comprised of a support skeleton 112 that confines and spaces a square array of fuel rods 114. Such fuel rod assemblies 110 may include a 14×14, 15×15, or 17×17 square array of fuel rods 114, depending on the manufacturer. The support skeleton 112 is formed from an array of thimble tubes 116 interspersed between the fuel rods 114 that are interconnected to a top nozzle 118 and a bottom nozzle 119 by thimble screws (not shown). Disposed between the top and bottom nozzles 118 and 119 are a plurality of uniformly spaced grids 121. As was previously pointed out, the grids are generally formed from an "egg crate" configuration of sheet metal that defines a plurality of cells that surround the fuel rods 114. Prior to actuation, a fuel rod assembly 110 includes a control rod assembly (not shown) formed from an array of neutron-absorbing cadmium rods that are slidably removable from the assembly 110 when start-up is desired. The lower end of the bottom nozzle 119 includes four feet 130a–130d upon which the fuel rod assembly 110 stands. In some models of fuel rod assemblies 110, each of these feet 130a–130d includes reinforcing flanges 131 that extend over some of the thimble screws that attach the bottom nozzle 119 to the thimble tubes 116.

The improved fuel assembly repair and reconstitution system 100 comprises an elevator and carriage assembly 200, a grinding tool 300, a rod handling tool 400, a dual-access tool positioner 500, and a thimble screw installation plate 600.

The elevator and carriage assembly 200 of the invention 100 includes a height-adjustable frame 201, an elevator assembly 202 that has a carriage drive 203 for moving a carriage 204 to a selected point along the longitudinal axis of the frame 201, and a basket inverter 205 for selectively inverting a pair of adjacent baskets 206a, 206b that are rotatably mounted onto the carriage 204.

The grinding tool 300 includes a base plate 301 that is positionable over the feet of an inverted fuel rod assembly 110, a fluid motor 303 (shown in FIG. 3c) contained within a waterproof housing 304 for driving a grinding head 305, and a guide assembly 306 for linearly guiding the grinding head 305 (also shown in FIG. 3C) into a support flange 131 of a bottom nozzle foot 130a–130d, and a linear drive 307 for urging the grinding head 305 into a foot 130a–130d to abrasively remove a portion thereof and thereby to afford access to all of the thimble screws that connect the bottom nozzle 119 to the thimble tubes 116.

The rod handling tool 400 includes a length-adjustable housing 401 having a lift motor 404 at its proximal end, and a gripper 405 at its distal end. A pulley assembly 409 interconnects the lift motor 404 with the gripper 405 so that the gripper may selectively grip, lift, lower and ungrip a fuel rod.

The dual-axis positioner 500 includes a slave carriage assembly 501 for moving a tool guide 402 to selected positions over the baskets 206a, 206b. The positioner 500 further includes a master carriage assembly 503 that is remotely connected to the slave carriage assembly 501 by means of a cable linkage 510. Finally, the thimble screw installation plate 649 includes a plate 650 that is receivable within the bottom portion of a bottom nozzle 119, and that includes a plurality of screw-retaining wells 655 circumscribed by urethane sleeves 663 for retaining a plurality of thimble screws therein. The screw-retaining wells 655 are arrayed in the same pattern as the screw holes at the lower surface of the bottom nozzle 119, so that the plate may act as a "screw template" to greatly expedite the reconnection of a bottom nozzle 119 to the thimble tubes 116 of a fuel rod assembly 110.

In the method of the invention, the system 100 is installed within the spent fuel pool 111 of a nuclear power plant facility by first adjusting the height of the frame 201 of the elevator and carriage assembly 200 so that the carriage drive 203 will not be submerged in water when the frame 201 is lowered into the spent fuel pool 111. Next, the carriage drive 203 of the elevator assembly 202 is used to lower the adjacent baskets 206a, 206b to a level near the bottom of the spent fuel pool 111. The top cap 289 of each of the baskets 206a, 206b is then opened and pivoted over in order that a fuel rod assembly 110 may be slidably admitted into each. To facilitate the admission of fuel rod assemblies 110 in each of the baskets 206a, 206b, a guide funnel 299 is placed around the upper edge of each of the open baskets 206a, 206b. Once a fuel assembly 110 has been lowered into each of the baskets 206a, 206b, the top caps 289 are pivoted over and latched shut, and the axial clamps 294 provided in each are screwed down so that the fuel rod assemblies 110 are firmly axially seated within their respective baskets.

Next, the carriage drive 203 of the elevator and carriage assembly 200 is actuated to lift the baskets 206a, 206b to a convenient yet safe height below the water level in the spent fuel pool, which is typically five to ten feet. Such levels allow easy access to the fuel assemblies within the baskets by the system operators while still providing a sufficient amount of water between the fuel assemblies and the operators to substantially block the radiation emanating therefrom. If the bottom nozzles of the fuel rod assemblies are easier to remove than the top nozzles 118, the two fuel assemblies 110 are next inverted by actuating the basket inverter 205 that rotatably connects the two baskets 206a, 206b to the elevator assembly 209. The bottom caps 290 of the two baskets 206a, 206b are each unlatched and pivoted open, thereby allowing access to the bottom nozzles 119 of each of the fuel assemblies 110. The bottom nozzles 119 are next removed by placing the base plate 301 of the grinding tool 300 over the feet 130a–130d of the bottom nozzle 119. The grinding motor 303 is then actuated, and the guide assembly 306 and linear drive 307 are used to guide and urge the grinding head 305 into the screw-obstructing portions 131 of the feet 130a–130d. The thimble rod screws are removed, along with the bottom nozzle 119 of each of the fuel assemblies 110. The dual-axis tool positioner 500 is then mounted over the open ends of the assemblies 110. The height of the rod handling tool 400 is next adjusted so that the gripper 405 of this tool may be lowered into the dual-axis tool positioner 500 without submerging the lift motor 404 contained in the proximal end thereof. The gripper 405 that is present at the distal end of the rod handling tool 400 is then lowered into the funnel 626 of the tool guide 502 that is movably mounted on the dual-axis tool positioner 500. This funnel 626 leads the gripper 405 into the positioning sleeve of the tool guide 52. Once this step has been completed, the operators of the system systematically remove fuel rods 114 from one of the fuel assemblies 110, and insert these fuel rods 114 at desired locations within the other fuel rod assembly 110 located beside it by jointly operating the master carriage assembly 503 of the dual-axis tool positioner 500, and the gripper 405 and lift motor 404 of the rod handling tool 400.

After the fuel rod switching operation has been completed, both the rod handling tool 400 and the dual-axis tool positioner 500 are withdrawn from the baskets 206a, 206b. Bottom nozzles 119 are next installed over the bottom end of each of the fuel rod assemblies 110 by placing a new inverted nozzle 119 along with the thimble screw installation plate 650 over the open end of each of the fuel assemblies, and using the plate 650 as a "screw template". The bottom caps 290 of the baskets 206a, 206b are then closed. In the final step of the method, the baskets 206a, 206b are reinverted back into their original orientation, and lowered back near the bottom of the pool 111 by the elevator assembly 203. The top caps 289 are then reopened, and the reconstituted or repaired fuel assemblies 110 are withdrawn from the baskets 206a, 206b.

Specific Description of the Structure and Operation of the System

Figure 2A:
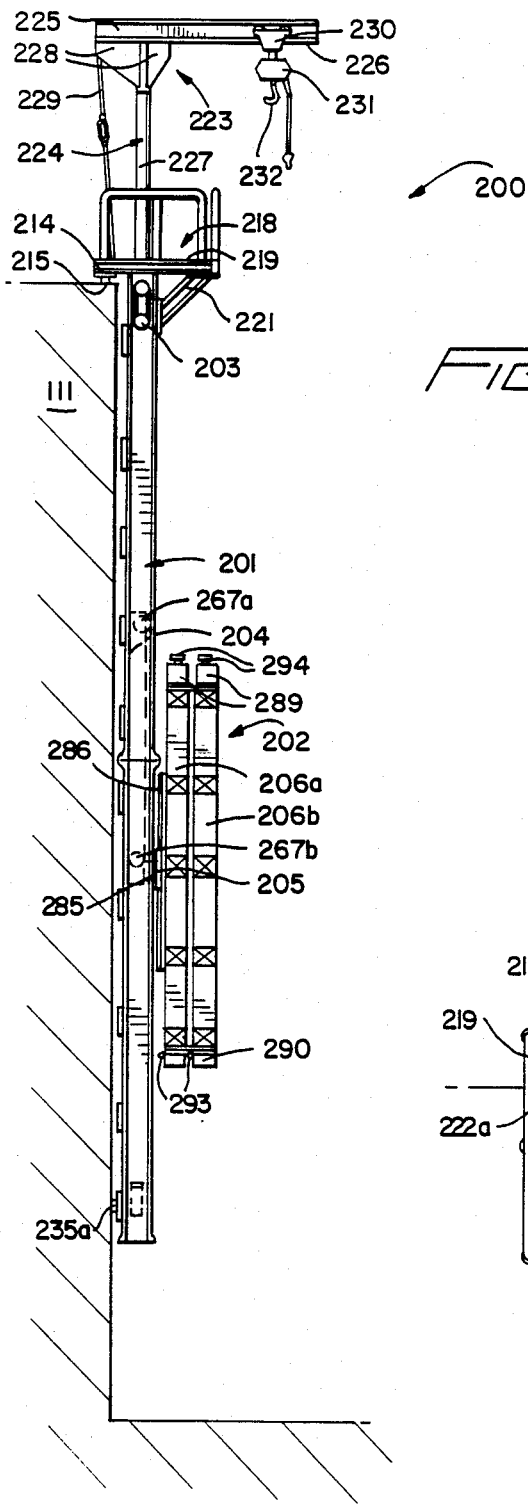
FIG. 2A is a side view of one embodiment of the elevator and carriage system of the invention.

With reference now to FIG. 2A, the elevator and carriage assembly 200 of the overall system 1 generally includes an elongated, height-adjustable frame 201, an elevator 202 formed from a carriage drive 203 that raises and lowers a carriage 204 slidably mounted within the frame 201, and a basket inverter 205 that rotatably connects a pair of side-by-side fuel assembly baskets 206a and 206b to the carriage 204. As will be described in detail hereinafter, the basket inverter 205 has a gear train 207 (shown in FIG. 2I) that is manually and remotely operable by means of a long-handled socket wrench (not shown) for rotating the baskets 206a, 206b from a right-side-up to an inverted orientation and back again.

Figure 2C:
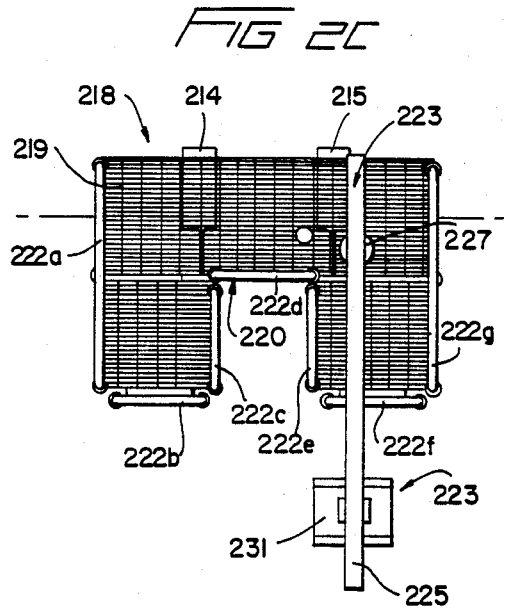
FIG. 2C is a plan view of the elevator and carriage system of FIG. 2B as seen across the line 2C—2C.
Figure 2B:
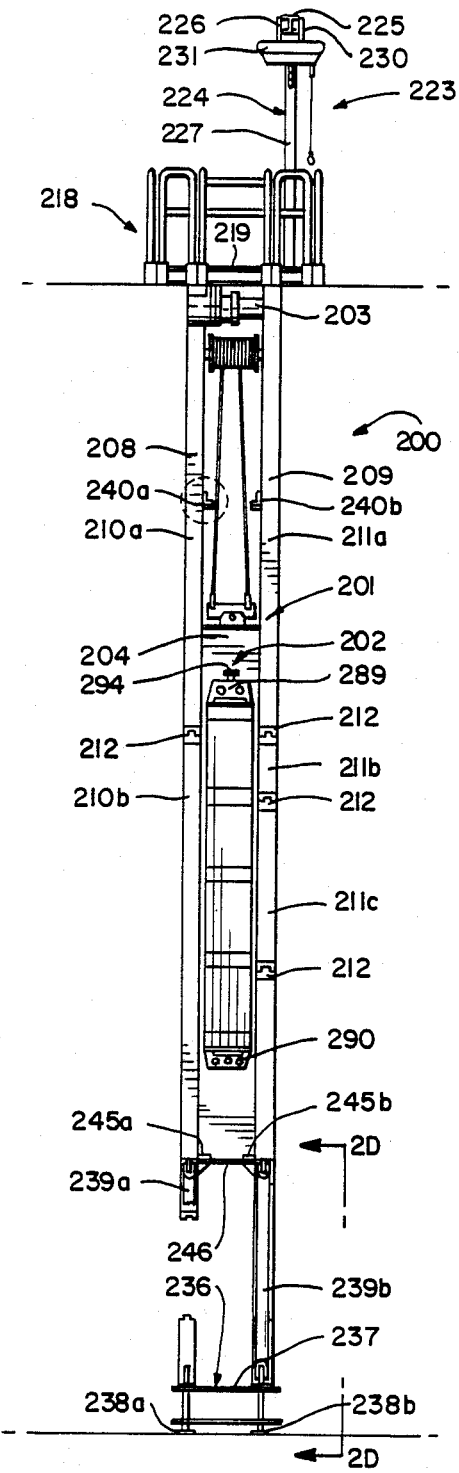
FIG. 2B is a front view of a second embodiment of the elevator and carriage system.

As is shown in FIGS. 2A and 2B, the frame 201 is largely formed from a pair of parallel rails 208 and 209. Each of these rails, in turn, is comprised of a plurality of colinear I-beams 210 and 211 which are detachably connectable so that the vertical height of the frame 206 may be adjusted to any desired extent. Such adjustability is facilitated by the provision of joints 212 between the I-beams 210 and 211 that are formed by overlapping flanges connected together by insertable and removable pins (not shown). Alternatively, tie plates may be used to effect the joining of adjacent I beams 210 and 211. When the elevator and carriage system 200 is installed in a particular spent fuel pool, the top of the frame 201 must be high enough so that the carriage drive 203 (which includes an electric motor) is not submerged in the water of the pool. Additionally, the bridge 218 on the frame 201 (which will be discussed in detail later) must not only be above the water, but must also be at a height that allows the system operators to safely and easily work on the fuel assemblies contained in the baskets 206a, 206b. Hence, the height and adjustability of the frame 201 is an important feature, since it allows both the carriage drive 203 and bridge 218 to be properly positioned over a spent fuel pool of virtually any dimension and at any water level by simply adding or subtracting the number of I-beam sections 210 and 211 forming the rails 208, 209.

The top end of the frame 201 may include a pair of L-shaped mounting pads 214, 215 connected on the upper ends of each of the rails 208 and 209, respectively. One of these mounting pads 214 may be seen in FIG. 2A. In this particular embodiment of the invention, the mounting pads 214, 215 allow the frame 201 of the system 200 to be securely wall-mounted over an upper edge of the spent fuel pool 111. In addition to the pads 214, 215 and feet 216, 217, other supports may be used to ensure that the frame 201 is securely installed in the pool 111. In order to prevent the mounting pads 214, 215 from slipping, each of the pads includes a high-friction foot 216, 217 (of which only foot 214 is visible) that securely engages the concrete lip of the spent fuel pool 111. In addition to the pads 214, 215 and feet 216, 217, other supports may be used to ensure that the frame 201 is securely installed in the pool 111. Also mounted on the top end of the frame 201 is the previously mentioned bridge 218. The purpose of the bridge 218 is to provide the operators of the system 100 with a work position that offers easy visual and physical access to all of the major components that form the system 100. The bridge 218 of the frame 201 includes a floor 219 formed from an aluminum grating. As is best seen with respect to FIG. 2C, this floor 219 includes a centrally disposed, U-shaped recess 220 that provides direct vertical access to the upwardly oriented ends of the fuel assembly baskets 206a, 206b. Support angles 221 are provided between the bottom of the floor 219 and the upper end of the frame 201 in order to strengthen the floor 219. Additionally, guard rail sections 222a-222g are provided around the outer perimeter of the floor 219 in order to prevent system operators from accidentally falling into the spent fuel pool 111. In the preferred embodiment, the two legs of each of the guard rail sections 222a-222g are easily insertable into or removable from a pair of tubular sockets placed beneath the grating that forms the floor 219. Such a structure facilitates both the assembly and the disassembly of the elevator and carriage system 200.

In order to assist the operators in manipulating the various components of the overall system 100, a jib crane assembly 223 is provided on the bridge 218 as shown. This jib crane assembly 223 includes a portable frame 224 formed from a support arm 225 having a rail 226 welded onto its bottom portion, and a vertically oriented post 227 that is connected to the support arm 225 at its upper end, and inserted into a cylindrically shaped socket (not shown) at its lower end. In order to strengthen the frame 224, support gussets 228 are provided at the joint between the support arm 225 and the upper end of the post 227, as well as a turnbuckle 229. A wheeled trolley 230 is slidably engaged onto the rail 226 of this support arm 225. A lift motor 231 whose output shaft is connected to a hook 232 via a cable 233 is mounted onto the trolley 230. In operation, the angular movement made possible by the pivotable post 227 of the frame 224, in combination with the radial and vertical motion provided by the trolley 230 and the lift motor 231, allows the system operators to manipulate any of the components of the system 100 and especially the rod handling tool 400 at any desired location over the baskets 206a, 206b.

Figure 2D:
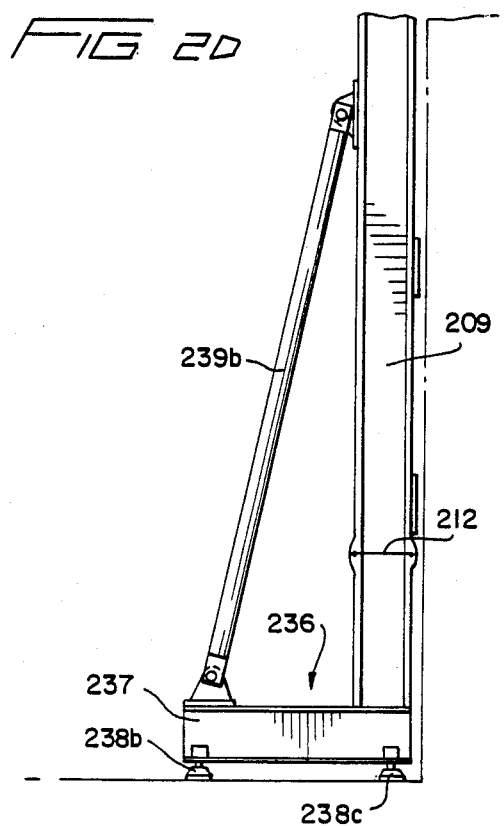
FIG. 2D is a partial side view of the elevator and carriage system illustrated in FIG. 2B.

Turning now to the lower end of the frame 201, stand-offs 235a, 235b are provided in the embodiment illustrated in FIG. 2A that utilizes mounting pads 214, 215 to install the frame 201 over the side of the spent fuel pool 111. However, where such side-mounting is not feasible, a support platform 236 may be provided as is present in the embodiment illustrated in FIGS. 2B and 2D. Such a support platform 236 includes a base plate 237 that is securely mounted to the bottom ends of the each of the rails 208, 209 of the rame. Four screw-mounted leveling pads 238a-238d are provided at the four corners of the rectangularly shaped base plate 237 so that the frame 201 can be accurately vertically oriented within the spent fuel pool. In order to rigidify the support platform 236, a pair of truss bars 239a, 239b are connected between the two outer corners of the base plate 237, and the rails 208, 209.

In order to ensure that the fuel assembly baskets 206 will never be lifted to an unsafe height with respect to the level of the water in the spent fuel pool, upper stop members 240a, 240b are provided on each of the rails 208, 209. FIG. 2E illustrates the structure of each of these stop members in detail. Briefly, each of the upper stop members 240a, 240b is formed from a right-angle bracket 241 having a rigidifying gusset 242 between its two legs, and a rubber bumper pad 243 mounted on its downward-facing leg in the position shown. In order to accommodate different water levels in diffeent spent fuel pools, the position of each of the upper stop members 240a, 240b is adjustable along the longitudinal axis of its respective rail by means of bolts 244 that are threadably engageable into one of a number of threaded bolt holes (not shown) that are uniformly spaced along the longitudinal axes of each of the rails 208, 209. The provision of such upper stop members 240a, 240b is important, since the system operators might be exposed to dangerous levels of radioactivity if the carriage 204 of the elevator assembly 202 were allowed to lift the fuel assembly baskets 206a, 206b to a level less than about five feet below the water line in the spent fuel pool 111. In addition to the upper stop members 240a, 240b, a pair of lower stop members 245a, 245b are provided between the rails 208, 209 of the frame 201 in the position shown in FIG. 2B. These lower stop members 245a, 245b are similar in structure to the previously discussed upper stop members 240a, 240b, the only significant difference being that a lateral support bar 246 is provided between the members 245a, 245b. The provision of such a support bar 246 is necessary since the lower stop members 245a, 245b must be strong enough to bear the entire weight of the carriage 204 and the fuel assembly baskets 206a, 206b. In the event of a failure on the part of the elevator assembly 203, the lower stop members 245a, 245b will prevent the carriage 204 from driving the fuel assembly baskets 206a, 206b into either the support platform 236 or against the hard concrete floor of the spent fuel pool, where damage to both the elevator and the carriage system 200 and the fuel assemblies contained within the baskets 206a, 206b could result.

FIG. 2F illustrates the carriage drive 203 of the elevator and carriage assembly 200. Basically, the carriage drive 203 is formed from an electrically operated drive motor 250 having an output shaft 251 that is connected to the input of a transmission 252. The output of the transmission 252 is in turn connected to a drive gear 253. A chain 254 looped around the drive gear 253 and a drum gear 255 transfers motive power from the drive motor 250 to the drum 255 of the carriage drive 203. Specifically, the drum gear 255 is coupled to a shaft 256 that is in turn concentrically mounted with respect to the axis of rotation of the drum 257. In order to minimize friction within the carriage drive 203, the drum shaft 256 is rotatably mounted on a bearing 258, 259 on either side thereof. The purpose of the drum 257 is to reel and unreel a pair of cables 261a, 261b on its left- and right-hand sides, respectively. In order to separately maintain the windings of these two cables 261a, 261b, the drum 257 is provided with a cable-restraining flange 262a, 262b on its left- and right-hand sides, respectively, as well as a centrally disposed flange 263. While a single cable could be used to raise and lower the carriage 204 within the frame 201, the use of two cables is preferred, wherein each cable is strong enough to independently support both the carriage 204 and the fuel assembly baskets 206a, 206b. Such structural redundancy ensures that the carriage 204 and fuel assembly baskets 206a, 206b will not fall through the bottom of the frame 201 should either of the cables 261a or 262b break.

FIG. 2G illustrates the carriage 204 of the elevator assembly 202. The carriage 204 is generally formed from an elongated, rectangular body 265. A yoke 266 is provided at the top of the rectangular body 265 for connecting the carriage 204 to the cable 261a, 261b. The rectangular body 265 includes a pair of upper wheels 267a, 267b, and a pair of lower wheels 268a, 268b. As is indicated in FIG. 2A, the upper wheels 267a are offset toward the front face of the rectangular body 265, while the lower wheels 268a, 268b are offset toward the back face of the body 265. The purpose of such offsetting is most easily understood with respect to FIG. 2A. When the fuel assembly baskets 206a, 206b are connected onto the rectangular body 265 of the carriage 204 as shown, the weight of the fuel assembly baskets 206a, 206b applies a moment or torsional force to the reactangular body 265 that tends to engage the upper, front face of the body 265 against the front flanges of the I-beams 210, 211 forming the rails 208, 209, while at the same time engaging the bottom, rear face of the rectangular body 265 against the rear flanges of these I-beams. The offsetting of the upper wheels 267a, 267b and lower wheels 268a, 268b (each of whose diameter is less than the width of the rectangular body 265) is necessary to place the wheels of the carriage 204 into engagement with the flanges of the I-beams forming the rails 208, 209, and to prevent scraping between the rectangular body 265 and the flanges of the rails 208, 209. In order to prevent the rectangular body 265 from scraping against the inner sides of either of the rails 208 and 209, upper side casters 269a, 269b and lower side casters 270a, 270b extend out of the sides of the rectangular body 265 in the positions illustrated.

FIGS. 2G, 2H and 2I illustrate the basket inverter 205 that rotatably connects the fuel assembly baskets 206a, 206b to the carriage 204. The basket inverter 205 has a drive shaft 274 whose upper end includes a hexagonal head 275 that is engageable within the hexagonal socket of a long-handled wrench (not shown) operable from the bridge 218 of the frame 201. This drive shaft 274 is connected to a gearbox 276 by way of upper and lower universal joints 277a, 277b. As is best seen in FIG. 1I, the lower end of the drive shaft 274 terminates in a worm gear 278 that meshes with an annular drive gear 279. This drive gear 279 is in turn mounted around the shaft 280 of a hub 281 that extends out of the front face of the rectangular body 265 of the carriage 204. The hub 281, of course, rotates whenever the hexagonal end 275 of the drive shaft 274 is rotated by a system operator. To minimize friction within the gearbox 276, the rotatable shaft 280 and its projecting hub 281 are rotatably mounted within bearings 282a, 282b at its rear and front ends, respectively. In order to rotate the baskets 206a, 206b, a considerable amount of torque must be applied due to the weight of these baskets, coupled with the fluid friction they experience as a result of being submerged. However, the mechanical advantage provided by the worm gear 278 and annular drive gear 279 in the gearbox 276 allows a system operator to manually rotate these baskets 206a, 206b under water within a reasonably short period of time. While such rotation is normally performed for the purpose of inverting any fuel assemblies that may be contained within the baskets 206a, 206b, the basket inverter 205 may also be used to position the baskets 206a, 206b in any desired angular orientation with respect to the carriage 204. To mount the fuel assembly baskets 206a, 206b onto the rotatable hub 281 of the basket inverter 205, a connecting plate 284 is provided therebetween (see FIG. 2A). The connecting plate 284 is rectangular in shape, and is securely welded onto the rear surface of the inner basket 206b. At the center of the connecting plate 284 is a collar 285 that is detachably mountable around the rotatable hub 281. In the preferred embodiment, this collar 285 is aligned with the center of mass of the fuel assembly baskets 206a, 206b so that these baskets are balanced around the hub 281. Such balancing makes it easier for the operator to smoothly turn the baskets 206a, 206b about the hub 281, and also reduces the amount of stress applied to the worm gear 278 and annular drive gear 279 within the gear box 276. In the preferred embodiment, the connecting plate 284 includes a plurality of reinforcing ribs 286.

As shown in FIGS. 2A, 2B and 2J, each of the baskets 206a, 206b includes an upper cap 289 as previously mentioned. This upper cap 289 is pivotally connected along one side of the rectangular housing 288 that forms each of the baskets by means of hinges 291a, 291b that rotate about a pin 292. A screw-operated latch 293 is provided on the side of the upper cap 289 opposite the hinges 291a, 291b (see FIGS. 2A and 2B). Each of the baskets 206a, 206b further includes a lower cap 290; however, since the structure of the lower cap 290 is identical to the portion of the structure of the upper cap 289 just described, no discussion of the hinges and latch of the lower cap 290 will be provided.

The only significant difference in the structures of the upper cap 289 and lower cap 290 of each of the baskets 206a, 206b is that the upper cap 289 includes an axial clamp 294. This clamp 294 has a rotatable handle 295 that is connected to a threaded rod 296. The lower end of this threaded rod 296 is in turn rotatably connected to a plate 297. The threaded rod 296 is threadedly engaged to a sleeve (not shown) located in the upper part of the cap 289. When the handle 295 is rotated, the clamping plate 297 travels axially toward or away from the fuel assembly contained within the basket in "riding nut" fashion. Disposed between the bottom surface of the plate 297 and the fuel assembly contained within the rectangular housing 288 is a resilient urethane pad 298. This pad 298 serves two functions. First, it provides some degree of axial slack or tolerance within the rectangular housing 288. Such slack is useful, because whenever the top or bottom nozzle 118, 119 of a fuel assembly 110 is replaced, the axial dimensions of the new top or bottom nozzle may not be exactly the same as the axial dimensions of the nozzle replaced. Accordingly, if the old nozzle is replaced with a new nozzle having a longer axial dimension, the compressibility of the urethane pad 298 will allow the overlying cap 289 or 290 to be successfully closed over the new nozzle. Secondly, if the axial clamp 294 is not screwed down far enough, or if the new nozzle is shorter than the one being replaced, the urethane pad 298 will act as a shock absorber when the fuel assembly axially slides within the rectangular housing 288 during an inversion operation.

In the preferred embodiment, the width and length of the rectangular housings 288 that form the body of the baskets 206a and 206b are made so that only about 0.075 inches of clearance exists between the inner walls of the housing 288, and the outer surface of the fuel assembly contained therein. The purpose for providing such relatively small clearances between the walls of the rectangular housing 288 and the outer surfaces of the fuel assemblies helps to properly align the fuel assemblies within the baskets 206a, 206b during a repair or reconstitution operation. To facilitate the insertion of a fuel assembly within the rectangular housing 288 of the baskets 206a, 206b, a rectangular funnel 299 (shown in FIG. 1) is provided. This rectangular funnel 299 has a rectangular flange that is insertable around the inner edge of an open end of the housing 288. In operation, the rectangular funnel 299 conveniently guides the bottom nozzle 119 of a fuel assembly 110 into an open end of the rectangular housing 288 of one of the baskets 206a or 206b.

FIGS. 3A, 3B and 3C illustrate the grinding tool 300 of the system 100 of the invention. Generally speaking, the purpose of the grinding tool 300 is to grind away the foot portions 131 of the bottom nozzle 119 of a fuel assembly 110 that mechanically interferes with access to the heads of certain thimble screws which attach the bottom nozzle 119 to the thimble tubes 116. To this end, the grinding tool 300 includes a generally square baseplate 301 having four angular guide feet 302a–302d for properly positioning the tool 300 over the feet 130a–130d of an inverted bottom nozzle 119, a fluid motor 303 encapsulated within a waterproof housing 304 for driving a grinding head 305, and a guide assembly 306 and linear drive 307 for reciprocably moving the grinding head 305 into and out of engagement with the screw-obstructing portions 131 of the nozzle feet 130a–130b.

With specific reference now to FIGS. 3A and 3B, the square baseplate 301 includes four angular guide feet 302a–302d placed at each of its four corners, respectively. In operation, the fuel assembly 110 is inverted by means of the previously described elevator and carriage system 200 so that the feet 130a–130d of the bottom nozzle 119 of the fuel rod assembly 110 extend upwardly. The baseplate 301 is placed over the vertically extending feet of the bottom nozzle 119 by means of a U-shaped handling bracket 308 that is connected over the top face of the baseplate 301 by standoffs 309a and 309b. When the baseplate 301 is so positioned, the outersides of the feet 130a–130d of the bottom nozzle 119 are slidably captured within the inner sides of the angular guide feet 302a–302d. Each of the guide feet 302a–302d is detachably connected onto the bottom surface of the baseplate 301 by means of screws 311. It should be noted that alternate screw holes 312 are provided in the baseplate 301 so that the position of the angular guide feet 302a–302d may be adjusted to accommodate bottom nozzles 119 of different sizes.

Located near one of the corners of the baseplate 301 is an elongated slot 313. This slot 313 allows the grinding head 305 of the invention to extend below the bottom surface of the baseplate 301, and to move at a 45° angle with respect to the sides of the baseplate 301. In addition to the slot 313, the baseplate 301 further includes a threaded bore 314 located near one of its edges. This bore 314 receives a threaded fitting 315 of the suction unit 316 of the invention. The upper end of the fitting 315 is connected to a suction pump (not shown), while the input end 317 generally faces the previously discussed slot 313. The purpose of the suction unit 316 is to vacuum up the metal grindings produced by the grinding head 305 so that they will not lodge themselves between the grids 121 of the fuel assemblies 110, and the fuel rods 114 that extend through the cells of the grids 121. If such metal grindings are allowed to accumulate in these regions, experience has shown that the sharp edges of the particles in combination with the vibration of the rods 114 can weaken and ultimately puncture the fuel rods 114 as a result of a fretting action With reference to FIG. 3C, the waterproof housing 304 of the grinding tool 300 includes the previously mentioned fluid motor 303. In the preferred embodiment, this fluid motor 303 is a Model 10L2008A air motor available from Cooper Air Tools located in Hicksville, Ohio. The top end of the motor 303 includes a coupling 320 for connecting the motor to a pressurized air input line 321. The bottom of the motor 303 includes an output shaft 322 onto which the previously mentioned grinding head 305 is connected. While anyone of a number of commercially available carbide burs could be used in the tool 300, a number 1110 ¾-inch by 1-inch cylindrical carbide bur available from the Falcon Tool Company, Inc. of Cleveland, Ohio, is prefered. The fluid motor 303 is securely positioned within the housing 304 by means of an inner casing 324 whose bottom end terminates in an annular flange 325. This annular mounting flange 325 is in turn mounted onto the octagonally shaped section of a paddle-shaped plate 347 by screws 326.

With reference again to FIGS. 3A and 3B, the housing 304 is largely formed from a tubular body 327. The top of this tubular body 327 is circumscribed by an annular flange 328 which includes a groove 329. This groove 329 in turn receives an O-ring 330. When a top round plate 332 is securely mounted onto the annular flange 328 by means of screws 334, the O-ring 330 provides a watertight seal between the upper surface of the flange 328 and the lower surface of the round top plate 332. Mounted in the center portion of the top round plate 332 are a pair of fittings 337a, 337b. Fitting 337a conducts the previously mentioned air input line 321 into the fluid motor 303. Fitting 337b pneumatically connects the interior of the housing 304 with an air output line 339. The purpose of the air output line 339 is to conduct the exhaust air expelled from the fluid motor 303 outside of the housing 304. In the preferred embodiment, the inner diameter of the air output line 339 is dimensioned so that a small but significant positive pressure is maintained within the housing 304 at all times during operation. The provision of such a positive pressure deters ambient water from seeping through any of the seals of the housing 304.

With reference now to FIGS. 3A and 3C, the bottom of the tubular body 327 also includes an annular flange 341. Like the previously described top annular flange 328, flange 341 is circumscribed by a groove 343 that receives an O-ring 345. When the bottom annular flange 341 is mounted into engagement around the octagonal portion of the paddle-shaped bottom plate 347 by means of screws 349, the O-ring 345 forms a watertight seal around the bottom annular flange 341. Located at the center of the octagonal section of the bottom plate 347 is a bore 351 through which the shaft 352 of the grinding head 305 extends. In order to maintain a watertight seal between the bore 351 and the shaft 352 during a grinding operation, a pair of O-rings 353 are provided in grooves 354 that circumscribe the bore 351.

Turning now to FIGS. 3B and 3C, the guide assembly 306 of the grinding tool 300 is formed from a pair of parallel rail brackets 357a, 357b, each of which is securely mounted in place on the baseplate 301 by means of screws 359. Disposed between the rail brackets 357 is an elongated rectangular guide member 361 which integrally forms the "handle" portion of the paddle-shaped bottom plate 347. This guide member 361 is freely slidable along the axis of the two rail brackets 357, and is held in place not only by the inner sides 362a, 362b of the rail brackets 357a, 357b, but also by the upper flanges 363a, 363b of these brackets.

With reference again to FIGS. 3B and 3C, the linear drive 307 of the grinding tool 300 is generally formed by a two-way hydraulic cylinder 365. In the preferred embodiment, cylinder 365 is a Model 02–1.5-DXP double-action cylinder manufactured by Bimba Manufacturing Company located in Monee, Ill. The output rod 367 of the cylinder 365 is connected to a vertically oriented bracket 369 that extends upwardly from the paddle-shaped bottom plate 347 at approximately the juncture between the octagonal portion of this plate, and the guide member 361. The rod 367 is threaded into the bracket 369 and locked therein by means of nut 370. Finally, the opposite end of the double-action cylinder 365 is secured onto the baseplate 301 by means of a conventional mounting bracket 372 and screws 374. In order that the operator may know the relative position of the grinding head 305 with respect to the screw-obstructing position 131 of a nozzle foot, scribe lines 378 and 380 are provided on the top plate 332 of the housing 304 and the baseplate 301, respectively.

In operation, the baseplate 301 of the tool 300 is placed over the feet 130a–130d of the bottom nozzle 119 of an inverted fuel assembly in the manner indicated in FIG. 3C. Next, both the fluid motor 303 and the suction motor (not shown) of the suction unit 316 are actuated. After the fluid motor 303 attains a speed of approximately 15,000 rpms, the double-action cylinder 365 is actuated both to move the grinding head 305 against a selected portion of the foot of a fuel assembly, and to urge the rotating grinding head 305 into the screw-obstructing portion 131 of the nozzle foot as it abrasively cuts through it. The operator knows that the cutting action has been completed when the scribe lines 378 and 380 are in alignment. Once this condition is met, the fluid motor 303 and suction motor of the suction unit 316 are each de-actuated, and the output rod 367 of the double-action cylinder 365 is withdrawn. The resulting C or crescent-shaped cut in the screw-obstructing portion 131 of the bottom nozzle foot allows a remotely operable wrench to be easily inserted into the corner thimble rod screw. If other corner screws are similarly obstructed, the tool 300 is withdrawn, rotated 90° and replaced as necessary. At the end of the grinding operation, all of the thimble rod screws may be easily removed, thereby allowing the bottom nozzle 119 of the fuel assembly 110 to be lifted away from the rest of the fuel assembly 110.

Figure 4A:
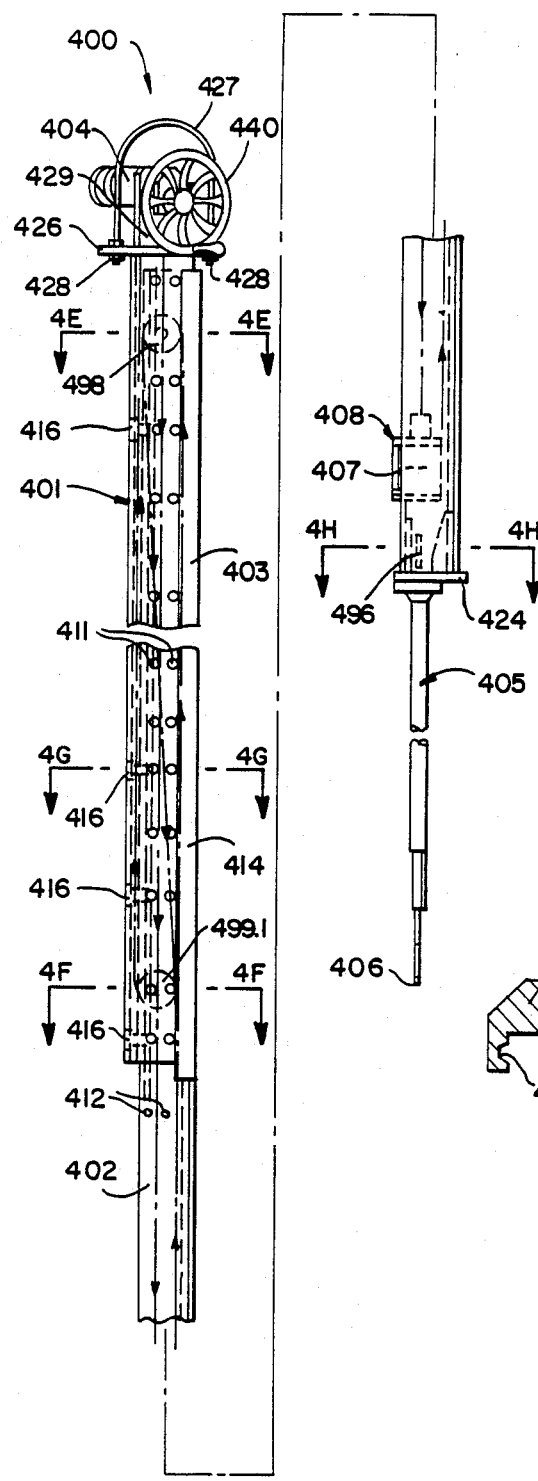
FIG. 4A is a side view of the rod-handling tool of the system.

With reference now to FIG. 4A, the system 100 of the invention further includes a rod-handling tool 400. The rod-handling tool 400 is generally comprised of a length-adjustable housing 401 formed from a distal inner leg that is slidably movable within a proximal outer leg 403. This tool 400 further comprises a lift motor 404 for raising and lowering a rod gripper 405 that includes a collet 406 for gripping and releasing the fuel rods, a double-action hydraulic cylinder 407 for operating the gripping and ungripping action of the collet 406, and a cylinder carriage 408 for slidably moving the cylinder 407 within the U-shaped interior of the length-adjustable housing 401. Finally, the tool 400 comprises a length-adjustable linkage in the form of a pulley assembly 409 for connecting the output of the lift motor 404 to the cylinder carriage 408 of the gripper 405. As will be described in detail hereinafter, the pulley assembly 409 includes a loop of drive cable 410 that is both connected to the cylinder carriage 408 of the gripper 405, and wound around the plurality of pulleys that form the pulley assembly 409. The specific configuration of pulleys employed in the housing 401 of the invention causes the loop drive cable 410 to automatically maintain a driving engagement with the output of the lift motor 404 when the length of the housing 401 is adjusted without the need for making any adjustments in the length of the cable 410. Hence, the length of the housing 401 may be adjusted as necessary to keep the lift motor 404 from being submerged without any need for replacing or adjusting any of the parts of the linkage between the lift motor 404, and the gripper 405 which the motor 404 raises and lowers within the housing 401.

With reference now to FIGS. 4A, 4E and 4F, both the inner leg 402 and the outer leg 403 are formed from elongated, angular members preferably fabricated from a strong, lightweight metal such as aluminum. As is best seen with respect to FIG. 4A, both the inner leg 402 and outer leg 403 include a uniformly spaced series of pairs of mutually registrable screwholes 411 and 412. The two legs 402 and 403 are mutually interconnected in the region where they overlap by means of screws 413 that extend through some of the pairs of mutually registrable screwholes 411 and 412. When the operator of the tool 400 desires to adjust the length of the housing 401, he merely removes the screws 413, slides the distal inner leg 402 along the longitudinal axis of the proximal outer leg 403 until the desired length is approximately obtained, and then aligns the nearest pairs of screwholes 411, 412. The screws 413 are then reinstalled in the registered pairs of screwholes 411, 412 that occur along the overlap of the two legs.

Figure 4G:
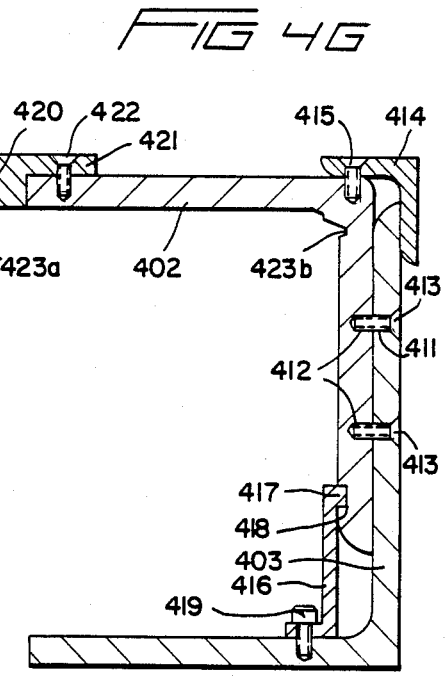
FIG. 4G is a cross-sectional view of the housing of the tool along the line 4G—4G in FIG. 4A, illustrating the feature of the housing that renders it height adjustable.

With reference to FIG. 4G, the exterior of the housing 401 includes a support angle 414 along the corner of the housing 401 in overlapping relationship with the spine of the inner leg 402, and an outer edge of the outer leg 403. This angle 414 is provided to rigidify the housing 401, and is secured thereto along only one of its edges by means of screw s 415 as shown. The use of such screws 415 along only one of the edges of the angle 414 secures the angle 414 onto the housing 401 without interfering with the sliding movement of the distal inner leg 402 with respect to the proximal outer leg 403 when the length of the housing 401 is adjusted. The interior of the housing 401 contains a plurality of alignment brackets 416, as indicated in FIG. 4A. These alignment brackets each include a flange 417 which is received within an alignment groove 418 present along the inside surface of the inner leg 402. These alignment brackets 416 are secured onto the outer leg 403 by means of screws 419. The purpose of the alignment brackets 416 is twofold. First, these brackets 416 maintain a linear alignment between the inner leg 402 and outer leg 403 when the length of the housing 401 is adjusted, which in turn facilitates the alignment between the pairs of mutually registrable screwholes 411, 412 present in the two legs.

Secondly, these brackets 416 strengthen and rigidify the housing 401. Disposed along the free edge of the inner leg 402 is a wheel guide 420. This wheel guide 420 includes a mounting flange 421 that is secured in place along the free edge of inner leg 402 by means of screws 422. This wheel guide 420 includes a wheel groove 423a. A second wheel groove 423b is present within the inner corner of the inner leg 402 in the position shown. The purpose of the wheel grooves 423a, 423b is to receive and to maintain the alignment of an array of opposing track wheels present in the cylinder carriage 408.

With reference to FIGS. 4H and 4I, the bottom or distal end of the housing 401 includes a bottom plate 424. As is particularly evident in FIG. 4I, this bottom plate 424 includes a centrally disposed bore 425a for receiving a portion of the cylinder carriage 408, and a bore 425b for receiving a stud that interconnects the upper portion of the gripper 405 with the bottom of the housing 401. With specific reference now to FIGS. 4B and 4C, the proximal or top end of the housing 401 includes a top plate 426 having a lanyard 427 connected thereto by means of bolts 428. Projecting outwardly from the top plate 426 is a motor mounting flange 429. As is most evident in FIG. 4B, this motor mounting flange 429 is canted at an angle of approximately 30° with respect to the overlapping flanges of the inner and outer legs 402, 403. This thereto by means of bolts 428. Projecting outwardly from the top plate 426 is a motor mounting flange 429. As is evident in FIG. 4B, this motor mounting flange 429 is canted at an angle of approximately 30° with respect to the overlapping flanges of the inner and outer legs 402, 403. This oblique inclination of the motor mounting flange 429 allows the pulleys that form the pulley assembly 409 to be advantageously arranged in a compact configuration.

With reference again to FIGS. 4B and 4C, the lift motor 404 is secured onto the motor mounting flange 429 by means of mounting screws 430, of which only one is shown. The lift motor 404 includes a transmission drive 430.1 that terminates in a shaft 431. The shaft 431 is connected to a drive pulley 432 which forms part of the pulley assembly 409. The drive pulley 432 includes hub flanges 433a, 433b projecting from its left- and right-hand sides, respectively. A thrust washer 434 is disposed between the free edge of the left-hand hub flange 433a and an annular shoulder formed in the drive shaft 431. To minimize friction, the left- and right-hand hub flanges 433a, 433b are each circumscribed by bearings 435a and 435b. Secured over the front face of the motor mounting flange 429 is a support cover 436. The support cover 436 supports and concentrically aligns the bearing 435b with the drive shaft 431. A slot 437 is provided at the bottom of the support cover 436 in order to freely conduct the loop of drive cable 410 that is wound around the drive pulley 432. The support cover 436 is mounted over the motor flange 429 by means of screws 438 as shown. Disposed within the right-hand hub flange 433b is the shaft 439 of a hand wheel 440. This shaft 439 is secured onto the hub flange 433b by means of a mounting pin 441a. The hand wheel 440 itself is in turn secured onto the shaft 439 by means of another mounting pin 441b. The hand wheel 440 allows an operator of the system 100 to manually raise or lower the cylinder carriage 408 at very slow speeds should any difficulties arise with the insertion or removal of a rod 114 from a particular fuel assembly 110. A decoupler (not shown) is preferably included in the transmission 430.1 of the motor 404 for decoupling the drive shaft 431 from the transmission 430.1 when the hand wheel 440 is turned. In order to facilitate the removal of the hand wheel 440 during periods of non-use, the mounting pin 441b includes a finger ring 442 that allows it to be easily withdrawn from the mutually alignable bores (not shown) present in the shaft 439 and hand wheel 440. The finger ring 442 is preferably attached onto the hand wheel 440 by means of a cable 443. In the preferred embodiment, lift motor 404 is preferably a Model No. 180-0185-B (face mounted) electrically operated gear motor available from B&B Motor and Control Corp. located in Long Island City, New York.

With reference now to FIGS. 4A and 4L, the gripper 405 of the rod-handling tool 400 includes the previously mentioned collet 406 for gripping and ungripping the end of a fuel rod. As is best seen in FIG. 4L, the collet 406 includes at least two gripping fingers 446 defined by axially oriented slots 447. The distal ends of the fingers 446 include flared edges 448. In the preferred embodiment, the entire collet 406 is formed from a resilient metal. At its proximal end, the collet 406 is threadedly connected to a first connecting rod 450 having approximately the same outer diameter as the cylindrically shaped collet 406. The proximal end of this first connecting rod 450 is connected to a coupling sleeve 451 that in turn connects the first connecting rod 450 with a second connecting rod 452 having a substantially smaller outer diameter. This second connecting rod 452 extends completely through the remainder of the gripper 405, and terminates at a point just above the top end of the cylinder carriage 408, where it is secured onto a bracket by means of a mounting nut 453.

Concentrically disposed around the collet 406 is a locking sleeve 454. This sleeve 454 is slidably movable with respect to the longitudinal axis of the collet 406, and is shown in its most extended position in FIG. 4L. When so extended, the sleeve 454 engages the flared ends 448 of the collet fingers 446, thereby pinching them inwardly. When retracted to its maximum extent (which would bring its distal edge back to about the enlarged portion of the slot 447) the sleeve 454 disengages the flared ends 448 of the collet fingers 446, thereby allowing these resilient fingers to radially expand. The inner diameter of the collet fingers 446 is dimensioned so that when the sleeve 454 is extended as illustrated in FIG. 4L, the collet fingers 446 will grippingly engage the end of any fuel rods inserted therein. Conversely, when the sleeve 454 is retracted, the same fingers 446 are dimensioned so that they will disengage any such fuel rod disposed in their interior.

The proximal end of the sleeve 454 is screwed onto the distal end of a lift tube 456. The proximal end of the lift tube 456 is in turn screwed onto a threaded nipple 458 that forms part of the cylinder carriage 408. Concentrically disposed around the lift tube 456 in telescopic engagement therewith is an inner guide sheath 459. The proximal end of the inner guide sheath 459 is circumscribed by a collar 460 that is received within an annular recess 461 of a sheath support ring 462. This sheath support ring 462 is in turn connected to the bottom plate 424 of the housing 401 by means of a mounting stud and nut 462.5. The purpose of the inner guide sheath 459 is to receive and protect a fuel rod gripped by the gripper 405 and lifted by the lift motor 404, and to accurately guide this fuel rod to a selected location when the lift motor 404 and gripper 405 lower and ungrip it. In order to maintain a proper alignment between the inner guide sheath 459 and the cylinder carriage 408, an outer sheath 463 is concentrically disposed around the inner guide sheath 459. This outer sheath also protects the inner guide sheath 459 and any fuel rod contained therein from accidental mechanical shock. On its proximal end, the outer sheath 463 is connected around the previously mentioned sheath-support ring 462. On its distal end, the outer sheath 463 is threadedly engaged onto a reinforcing ring 464 that includes a centrally disposed bore 466 that surrounds the inner sheath 459.

With reference now to FIGS. 4I, 4J and 4K, the cylinder carriage 408 of the rod-handling tool 400 includes a top plate 467a and a bottom plate 467b. The bottom plate 467b is in turn connected to the bottom surface of the cylinder 407 by means of four standoff rods 468a-d. As may best be seen with respect to FIG. 4J, the cylinder carriage 408 includes upper and lower wheels 469a, 470a, and 469b, 470b on its rear side. These wheels are rotatably mounted on the top and bottom plates 467a, 467b by means of upper and lower wheel brackets 471a, 471b. The outer edges of each of the wheels 469a, 470a, and 469b, 470b are tapered, and receivable into the wheel grooves 423a, 423b present within the wheel guide 420 and inner leg 402 of the housing 401. Also included on the top and bottom plates 467a, 467b are upper and lower cable connectors 472a, 472b. These cable connectors 472a, 472b mechanically connect the cylinder carriage 408 with the loop of drive cable 410 of the previously mentioned pulley assembly 409. A turnbuckle 473 is provided just below the lower cable connector 472b for making fine adjustments in the length of the loop of drive cable 410.

With reference to FIG. 4J, the cylinder 407 of the cylinder carriage 408 includes a sleeve 474 that slidably receives the proximal end of the collet-connecting rod 452. The sleeve is itself slidable within the cylinder 407 for a purpose that will be explained shortly. Under normal operating conditions, the distance between the collet 406 and the cylinder 407 of the cylinder carriage 408 remains constant. However, in order to provide for some adjustability of this distance, a height-adjustment bracket 475 is provided over the upper surface of the top plate 467a. This height-adjustment bracket 475 includes a flange 476. This flange 476 is sandwiched between the previously mentioned mounting nut 453, and a thumb wheel 477. Fine adjustments in the distance between the collet 406 and the cylinder 407 may be made by manually screwing the thumb wheel 477 and mounting nut 453 along the axis of the threaded end of the connecting rod 452.

Disposed beneath the cylinder 407 of the cylinder carriage 408 and extending through a bore in the bottom plate 467a is the output shaft 478 of the cylinder 407. An annular flange 479 is welded around the proximal end of the output shaft 478 a few inches from the lower surface of the bottom plate 467b. The proximal end of the output shaft 478 as well as the annular flange 479 is contained within a cylindrical spring well 480. This spring well 480 contains a compression spring 480.1 that urges the entire output shaft 478 into an extended position. Hence, the previously discussed sleeve 454 of the gripper 405 will always assume the extended position over the collet 406 (as is best seen in FIG. 4L) unless the cylinder 407 counteracts the force of the compression spring 480.1 by hydraulically withdrawing the output shaft 478. The provision of such a flange 479, spring well 480 and compression spring 480.1 ensures that, in the case of a hydraulic power failure on the part of the cylinder 407, the collet 406 of the gripper 405 will not accidentally ungrip and drop any fuel rod whose end happens to be enclosed within the collet 406. Hence, the combination of this flange 479, well 480 and compression spring 480.1 constitutes an important safety feature of the tool 400.

To counteract the automatic gripping effect provided by the compression spring 480.1 in the event of a hydraulic power failure, a manual collet release 481 is provided on the upper face of the top plate 467a. This manual collet release 481 is generally formed from a rocker arm member 482 that is pivotable about a pin mounted on a lug 484 which is integrally connected to the top plate 467a. The right-hand end of the rocker arm 482 is coupled to an actuator member 484.1. The actuator member 484.1 is in turn connected to the previously mentioned internal sleeve 474 that is concentrically disposed within the cylinder 407. This sleeve 474 is slidably movable within the body of the cylinder 407, and is connected to the output shaft 478 of the cylinder 407. The left-hand side of the rocker arm 482 is slidably engaged to a mechanical limiter formed from a stud 485 having a swivel eye. A pin 486 pivotally connects the swivel eye of the stud 485 to the top plate 467a. The threaded end 487 of the stud 485 extends through a bore 487.1 present in the left-hand side of the rocker arm 482. The upward extend to which the left-hand end of the rocker arm 482 can pivot is controlled by a nut 488 and washer 489 disposed around the threaded end 487 of the stud 485. Under normal operating conditions, the left-hand end of the rocker arm 482 rocks between the upper surface of the top plate 467a and the position illustrated in FIG. 4J, depending upon whether or not the cylinder 407 has retracted or extended the sleeve 454 with respect to the collet 406. However, should the hydraulic power to the cylinder 407 fail, the manual collet release 481 may be used to release any fuel rods grippingly engaged within the collet 406 by merely wringing the nut 488 downwardly so that the right-hand end of the rocker arm slidably lifts the output shaft 478 of the cylinder 407 against the compressive force applied by the spring 480.1 by lifting the actuator member 484.1.

With reference to FIGS. 4C and 4D, the pulley assembly 409 of the rod-handling tool 400 includes the previously mentioned drive pulley 432. To prevent slippage between the loop of drive cable 410 and the drive pulley 432, the cable 410 is wound around the perimeter of the drive pulley 432 at least twice. To maintain the resulting windings 492 around the edge of the drive pulley 432, side flanges 491a, 491b are provided on either side of the pulley 432.

With specific reference now to FIG. 4D, a cable tensioner 493 is provided at the proximal end of the housing 401 just below the drive pulley 432 in order to maintain a certain minimum amount of tension in the loop of drive cable 410. The tensioner 493 is formed from a tension spring 494 that pulls together a pair of rollers 495a, 495b that are slidably mounted in a bracket 494.1 affixed to the proximal end of the housing 401. In operation, the loop of drive cable 410 engages the inner edges of the two slidably mounted rollers 495a, 495b and the tension spring 494 maintains a desired amount of tension in the cable 410 by "pinching" the loop of cable 410 to a greater or lesser extent, depending upon the amount of slack present in the loop of drive cable 410.

The pulley assembly 409 of the rod-handling tool 400 further includes a first idler pulley 496 that is rotatably connected to the bottom plate 424 of the housing 401 by means of a rotatable mounting 497 (see FIG. 4H), a second idler pulley 498 that is rotatably connected to the inner leg 402 of the housing 401 by means of mounting 499 (see FIG. 4E), and a third idler pulley 499.1 that is rotatably mounted onto the outer leg 403 by means of a mounting 499.2 (see FIG. 4F). The relative posiiions of each of the first, second and third idler pulleys 496, 498 and 499.1 along the longitudinal axis of the housing 401 may be readily determined from FIG. 4A.

The manner in which the drive pulley 432 and idler pulleys 496, 498 and 499.1 interact to provide a linkage between the lift motor 404 and the gripper 405 that automatically adjusts its length to accommodate adjustments in the length of the housing 401 may be best understood with respect to schematic diagram 4M. From this diagram, it is clear that the drive pulley 432 and the third idler pulley 499.1 are each journalled on the outer leg 403 of the housing 401; hence, the longitudinal distance between these two pulleys never varies. From this diagram, it is also evident that the first idler pulley 496 and second idler pulley 498 are each journalled on the inner leg 402 of the housing 401. Hence, the longitudinal distance between these two pulleys never varies. However, when a length adjustment is made with respect to the housing 401, the longitudinal distance between the top end of the inner leg 402 does vary with respect to the bottom end of the outer leg 403. But despite any such variations between the relative positions of the inner and outer legs 402 and 403, the total length of the loop of drive cable 410 will remain the same. This advantageous property results from the fact that as distance A between the drive pulley 432 and the first idler pulley 496 becomes shorter, the distance B between the second and third idler pulleys 498 and 499.1 becomes greater by an equal amount. The use of such a pulley configuration advantageously obviates the need for replacing one or more of the parts of the linkage between the lift motor 404 and the gripper 405 whenever the length of the housing 401 is adjusted to accommodate spent fuel pools having different water levels.

In order to minimize the amount of width required within the legs 402 and 403 of the housing 401 to accommodate the pulley assembly 409, the pulleys 432, 496, 498 and 499.1 are advantageously arranged in the compact configuration illustrated in FIG. 4N. In this configuration, the drive pulley 432 is canted or inclined approximately 30° from the wall of the housing 401 (as may be appreciated from FIG. 4B). The first idler pulley 496 (which is the lowest or distalmost of the pulleys with respect to the longitudinal axis of the housing 401) is disposed at approximately a 60° angle with respect to the drive pulley 432. Finally, the second and third idler pulleys 498 and 499.1 are each disposed at a 60° angle with respect to both the drive pulley 432, and the first idler pulley 496. The end result is that the drive pulley 432 and the three idler pulleys 496, 498 and 499.1 form an equilateral triangle when viewed in plan. Such a configuration is clearly only half as wide as a planar arrangement of the pulleys 432, 496, 498 and 499.1 would be.

FIGS. 5A–5E illustrate the dual-axis tool positioner 500 for positioning the gripper 405 of the fuel rod handler 400. Generally, the dual-axis positioner 500 comprises a slave carriage assembly 501 that is detachably mountable over the fuel assembly baskets 206a, 206b of the elevator and carriage assembly 200, a tool guide 502 slidably movable on the slave carriage assembly 501, and a master carriage assembly 503 for remotely operating the slave carriage assembly 501 in order to position the tool guide 502 over a selected rod location in one of the fuel assemblies contained in the fuel assembly baskets 206a, 206b. The master carriage assembly 503 is manually operable from the bridge 218 of the elevator and carriage assembly 200. As is evident in FIG. 5E, the master carriage assembly 503 includes an X axis index 504 having a series of uniformly spaced points (each of which is designated by a particular letter) that correspond to the rod locations along the vertical axis of the fuel assemblies contained within the baskets 206a, 206b. The master carriage assembly 503 further includes a Y index 505 having two sets of uniformly spaced points (each of which is designated by a different number) that correspond to the rod locations along the horizontal axes of the two adjacent fuel assemblies contained within the baskets 206a, 206b. The master carriage assembly 503 further includes an X indicator 506 and Y indicator 507 for designating the location of the tool guide 502 in the slave carriage assembly 501. X and Y slidably movable hand drivers 508 and 509 are connected to the X and Y indicators 506 and 507, respectively. Finally, a cable linkage 510 formed from a pair of loops of cable connected between the X and Y hand drivers 508 and 509, and X and Y slave carriages 535, 520 serve to translate the movements of the indicators 506 and 507 of the X and Y hand drivers 508 and 509 into a positioning movement of the tool guide 502 over a selected rod location in one of the fuel rod assemblies.

With reference now to FIGS. 5A, 5B and 5C, the slave carriage assembly 501 includes a rectangular support frame 512 having a rectangular opening 513 in its interior for allowing access to the fuel assemblies contained within the baskets 206a, 206b. Mounted on the upper and side edges of this rectangular opening 513 are two pairs of alignment wedges 514a, 514b and 515a, 515b. As previously mentioned, the baskets 206a, 206b are dimensioned so that there is approximately 0.075 inches of clearance between the outer walls of the fuel assemblies, and the inner walls of the baskets 206a, 206b that contain them. The purpose of the alignment wedges 514a, 514b and 515a, 515b is to wedgingly engage the fuel assemblies when the slave carriage assembly 501 is placed over the baskets 206a, 206b so as to push them into the reference corners 515.1a and 515.1b of the baskets 206a, 206b, respectively. The provision of such alignment wedges 514a, 514b and 515a, 515b ensures that the individual rod locations on the fuel assemblies contained within the baskets 206a, 206b will be properly aligned with the X and Y slave carriages 535, 520 of the slave carriage assembly 501 after the positioner 500 is installed over the baskets 206a, 206b. In order to further ensure a proper alignment between the positioner 500 and the baskets 206a, 206b, a pair of index pins 516a, 516b (best seen in FIG. 5C) extend out through the bottom of the rectangular support frame 512. These index pins 516a, 516b are registrable within a pair of alignment bores present in a flange that both circumscribes and forms part of the baskets 206a, 206b. As used herein, the terms "vertical" and "horizontal" refer to the orientation of the slave carriages 535, 520 with respect to the legends in FIG. 5A.

With specific reference now to FIGS. 5A and 5B, the slave carriages of the slave carriage assembly 501 include a Y carriage 520 that is slidably movable in the horizontal direction across the rectangular support frame 512, and an X carriage 535 that is slidably movable in the vertical direction over the Y carriage 520. The Y carriage 520 is formed from a table plate 521 having a pair of in-tandem rollers 522a, 522b (of which only 522a is visible) mounted under one of its horizontal edges by means of roller brackets 523a, 523b. Each of the rollers 522a, 522b includes a distal hub 524 that is received under a guide flange 525 of a track 526. The track 526 is mounted on a support angle 528.2 that is connected to the upper horizontal edge of the rectangular support frame 512 by means of three spacing columns 526.1a, 526.1b, and 526.1c. On its opposite edge, the table plate 521 includes a pair of linear bearing blocks 527a, 527b arranged in tandem along the horizontal edge of the rectangular support frame 512 as shown. These bearing blocks 527a, 527b are slidably mounted onto a Thompson shaft 528 mounted on a support angle 528.1. The support angle 528.1 is in turn connected along the lower horizontal edge of the rectangular support frame 512 by spacer columns 529a, 529b, and 529c. The combination of the rollers 522a, 522b and linear bearing blocks 527a, 527b on the upper and [lower horizontal edges of the table plate 521, respectively, allow the plate 521 to easily and accurately slide along the horizontal axis of the rectangular support frame 512.

In order to provide a visual indication of the location of the tool guide 502 with respect to a particular horizontal grid location in one of the fuel assemblies, an index plate 531 is detachably mounted along the bottom support flange 528.1 of the previously described Thompson shaft 528. Staggered numbers 532 are provided along the axis of the index plate 531 adjacent to the horizontal rod locations of the fuel assemblies contained within the baskets 206a, 206b. The staggering of the numbers 532 allows them to be written as large as possible. So that each individual vertical rod location is designated by a unique number, negative descending numbers are used on the left-hand side of the index plate 531, while positive descending numbers are used on the right-hand side. Hence, for a 17×17 fuel rod assembly, the numbers -17 through -1 are printed in a staggered array along the left-hand side of the index plate 531, while the positive numbers 17 through 1 are printed on the right-hand side. In order that the operator may easily tell where the tool guide 502 is relative to a specific horizontal grid location, an indicator notch 533 is cut along the bottom edge of the table plate 521, as is shown in FIG. 5A. This number notch 533 is aligned with the horizontal location of the center line of the tool guide 502. So that this notch 533 will only display one of the staggered numbers present along the index plate 531, the width of the notch 533 is no wider than the widest of the numbers on the plate 531. To further assist the operator in determining the alignment between the tool guide 502 and a particular Y coordinate, a scribe line index 534 is placed along the lower edge of the index plate 531. The scribe line index 534 includes scribe lines 534.1 that corresponds more precisely with a particular Y rod coordinate than the staggered numbers 532 in the ndex plate 531. A pointer 534.2 is provided in the table plate 521 just below the indicator notch 533 in order to facilitate precise alignment between the tool guide 502 connected to the table plate 521, and a particular grid location along the Y axis.

With particular reference now to FIGS. 5B and 5C, the slave carriage assembly 501 further includes an X axis carriage 535. The structure and mechanical action of the X axis carriage 535 is in many respects identical to the structure of the previously described Y axis carriage. The X axis carriage includes a table plate 536 which is slidably mounted along the vertical axis of the table plate 521 of the Y axis carriage 520. More specifically, the table plate 536 includes a pair of in-tandem rollers 537a, 537b (of which only 537a is visible) that are rotatably mounted beneath the outer vertical edge of the table plate 536 by means of roller brackets 538a, 538b. Beneath its opposite edge, a pair of in-tandem linear bearing blocks 539a, 539b are mounted. These bearing blocks 539a, 539b are slidably mounted to a Thompson shaft 540 whose base flange 541 is mounted along the inner, vertical edge of the table plate 521 of the Y axis carriage 520. Further like the Y axis carriage 520, the X axis carriage 535 includes a detachably mountable index plate 542. However, in order to clearly distinguish the X-axis grid locations from the Y-axis rod locations, staggered letters A through S are used rather than numbers. The letters "I" and "O" are omitted from the letter sequence in order to avoid confusion between the number Y axis rod locations, and the lettered X axis rod locations. To further help the operator determine the position of the tool guide 502 with respect to the X axis of the fuel assemblies, an indicator notch 544 is cut into the table plate 536 along its outer edge as shown. This indicator notch 544 is vertically aligned with the center line of the tool guide 502. For enhanced accuracy, a scribe line index 545 and pointer 546 are also provided below the index plate 542 and below the indicator notch 544, respectively.

Turning now to FIG. 5E, the master carriage assembly 503 also includes a support plate 548. During the operation of the positioner 500, the support plate 548 of the master carriage assembly 503 is preferably mounted onto the bridge 218 of the elevator and carriage system 200.

Along its lower portion, the support plate 548 includes a detachably mounted master Y axis index plate 549. The master Y index plate 549 includes two sets of uniformly spaced bores 550a, 550b above the numbers in the two sets of staggered numbers 551a, 551b. Located directly above the master Y axis index plate 549 is the Y axis hand driver 509. The hand driver 509 is generally formed from a tubular handle 552 that is slidably mounted onto a tubular guide housing 553. The guide housing 553 is rigidly connected along the horizontal axis of the support plate 548 by means of mounting brackets 553.1a, and 553.1b. Extending out of the tubular handle 552 is the previously mentioned Y indicator finger 507. This Y indicator finger 507 has a stem portion 554 that extends completely through the tubular handle 552 and is slidably received in an elongated slot 555 present along the longitudinal axis of the tubular guide housing 553. Within the tubular guide housing 553, the stem portion 554 of the Y indicator 507 is connected to a cylindrical drive bearing 556 that drives one of the loops of cable that forms part of the cable linkage 510. On its opposite end, the Y indicator 507 has an indicator finger 557 that terminates in a ball detent 558 that is receivable within the uniformly spaced bores 550 present in the master Y-axis index plate 549.

Detachably mounted on the upper portion of the support plate 558 is a master X-axis index plate 561. Like the Y- axis index plate 549 previously described, the X-axis index plate also includes a plurality of uniformly spaced bores 562. A configuration of staggered alphabetic letters 563 is printed along the master X-axis index plate 561, with one letter adjacent to each of the uniformly spaced bores 562. The X hand driver 508 also includes a tubular handle 564 that is slidably mounted around a tubular guide housing 565 that is in turn secured onto the support plate 548 by mounting brackets 566a, 566b at either end. Like the previously discussed Y indicator 507, the X indicator 506 includes a stem portion 567 that extends through the tubular handle 564, and is slidably engaged within an elongated slot 568 present along the longitudinal axis of the tubular guide housing 565. In the interior of the tubular guide housing 565, the stem portion 567 of the X indicator 506 is connected to a cylindrical drive bearing 569. This drive bearing 569, like the drive bearing 556, is slidably movable within the tubular guide housing 565, and serves to drive a second loop of cable that forms part of the cable linkage 510. On its opposite end, the X indicator 506 includes an indicator finger 570 that terminates in a ball detent 571 that is receivable into the uniformly spaced bores 562 of the master X-axis index plate 561. In both cases, the ball detents 571 and 578 of the X and Y hand drivers 508, 509 provide both a visual and a tactile signal to the operator as to the positions of the X and Y hand drivers 508 and 509 with respect to the X-axis and Y-axis master index plates 561 and 549.

With reference to both FIGS. 5D and 5E, the cable linkage 510 of the positioner 500 includes a Y-axis linkage assembly 575 for linking the movement of the Y-axis hand driver 508 with the Y-axis slave carriage 520. With specific reference to FIG. 5E, this linkage 575 is formed from a first loop 576 of drive cable that extends through the tubular guide housing 553, around a pulley 577, and finally toward a pair of Y-axis loop outputs 579a, 579b. These Y loop outputs are connected (via appropriate cable coverings) to a pair of Y loop inputs 580a, 580b present on the Y axis carriage (see FIGS. 5A and 5B) through cable connectors 581a, 581b. The cable inputs 580a, 580b form a second loop 580.1 of cable extending from cable connectors 581a, 581b. The loop of drive cable extending out of the cable connectors 581a, 581b is arranged into a second loop 581.1 by a pair of vertical alignment pulleys 582a, 582b and three horizontal alignment pulleys 583a, 583b, and 583c as is best seen in FIG. 5D. A cable connector 584 is provided onto the second loop 581.1 for connecting this loop to a bracket 585 mounted on the Y axis carriage 520. Pulley 583a is canted as show n to avoid mechanical interference between the cable connector 584 and the rest of the linkage.

The cable linkage 510 of the dual-axis tool positioner 500 further includes an X-axis linkage assembly 587 for linking the motion of the X-axis hand driver 508 with the X-axis carriage 535. This linkage assembly 587 includes a first loop 588 of cable that is serially connected to the drive bearing 569, and which winds around the pulley 589 to form X-axis loop outputs 590a, 590b. These outputs are in turn connected to X-axis loop-inputs 591a, 591b via cable connectors 592a, 592b shown in FIGS. 5A and 5B. The drive cable that extends out of the X loop inputs 591a, 591b present on the X-axis carriage 535 is arranged into a second loop 592.1 by the vertical alignment pulleys 593a, 593b, and 593c mounted on the slave carriage assembly 501 as shown. This second loop 592.1 also includes a cable connector 594 that is in turn connected onto a drive cable bracket 595 mounted onto the X-axis carriage 535.

In order to secure the tool guide 502 into a desired position with respect to a particular set of X and Y rod locations, the cable linkage 510 includes both a Y lock mechanism 596, and an X lock mechanism 611.

With reference now to FIGS. 5A, 5B and 5C, the X lock mechanism 596 is formed from a lock cable 597 whose outer covering is engaged to a bracket 598 by means of cable connection 599. The distal end of the cable 597 itself terminates in a ball 600 that is received within a recess 601 located at the left-hand end of a rocker arm 602 that pivots about a pin 603. The right-hand end of the rocker arm 602 has a lock finger 605 that is insertable within a series of uniformly spaced bores 606 present along the upper edge of the index plate 531. In order to ensure that the lock finger 605 will disengage itself from the bores 606 when no tension is being applied onto a lock cable 597, a compression spring 607 is provided around the distal end of the cable between the bracket 598 and the left-hand end of the rocker arm 602. The actuator of the Y lock mechanism 596 is a tension lever 608 located on the support plate 548 of the master carriage assembly 503. This lever 608 includes a handle 609 which the operator may pivotally move whenever he desires to engage the lock finger 605 within one of the bores 606. Such an action will, of course, lock the tool guide 502 into a particular position along the Y axis of the slave carriage assembly 501.

The X lock mechanism 611 has virtually the same structure as the previously described Y lock mechanism 596. Briefly, with respect to FIGS. 5B and 5C, the X lock mechanism 611 includes a covered lock cable 612 whose outside covering is connected to a bracket 613 by way of a cable connector 614. The distal end of the lock cable 612 includes a ball 615 that is received within a recess 616 located at the left-hand end of a rocker arm 617 pivotally mounted on a pin 618. The right-hand side of the rocker arm 617 includes a lock finger 620 that is identical to the structure to the previously described lock finger 605. This lock finger 620 is insertable within bores 621 uniformly spaced along the upper edge of the Y carriage index plate 542. A compression spring 622 located around the distal end of the cable 612 and sandwiched the bracket 613 and the left-hand end of the rocker arm 617 withdraws the lock finger 620 from the bores 621 when no tension is being applied to the lock cable 612. As was the case with the Y lock mechanism 596, the X lock mechanism 611 is operated by means of a tension lever 623 having a pivotal handle 624 mounted on the support plate 548 of the master carriage assembly 503.

In all cases, the cables that form the cable linkage 510 are stainless steel cables covered by a coiled, stainless steel wire covering and lined with nylon in order to reduce friction between the cable cover and the cable disposed therein. It should further be noted that, in order to accommodate fuel rod assemblies different dimensions and different numbers of fuel rods, the X axis and Y axis index plates 531, 542, 549, and 561 are detachably connected to their respective frames and support plates so that they may be easily replaced with index plates having the proper distances between the detent and lock finger bores.

Finally, as is evident from FIG. 5B, the tool guide 502 is preferably formed from a funnel 626 that leads into a tubular guide sleeve 627 for receiving and guiding the distal end of the collet 405 of the rod-handling tool 400.

With reference now to FIGS. 6A and 6B, the thimble screw installation plate 649 of the system 100 includes a square plate 650 preferably formed from a strong, lightweight metal such as aluminum. Each of the corners 651a-d of the plate 650 are cropped so that the plate 650 can be received within the bottom of a bottom nozzle 119 without any mechanical interference from the feet 130a-d of the bottom nozzle 119. The plate 650 includes an array of bores 652 that are registrable with the pattern of thimble screws (not shown) that hold the bottom nozzle 119 to the thimble tubes 116 of the support skeleton 112. Disposed around the top end of each of the bores 652 is an annular recess 653 for receiving the cylindrical body of a screw-retaining well 655. Preferably, the wells 655 are affixed within the annular recesses 653 by means of tack welds 656.

Each of the screw-retaining wells 655 includes a bore 659 concentrically aligned with its longitudinal axis. It is important to note that the minimum diameter of the bore 659 is larger than the head of the screw it retains so that the screw can pass easily through the bore 659 during a bottom nozzle installation operation. With specific reference to FIG. 6B, the upper end of the bore 659 includes a further annular recess 661 for receiving a urethane sleeve 663. The internal diameter of the urethane sleeve 663 is somewhat smaller than the outer diameter of the head of the screw that it retains so that the sleeve 663 will hold the screw in alignment with the bores 659 and 652 of the well 655 of the plate 650. In the preferred embodiment, urethane having a hardness of between about 60 A and 75 A durometers is used to fabricate the sleeve 663. Such a sleeve is soft enough to allow the manual insertion of thimble screws within the sleeve 663, yet is hard enough to firmly retain these screw s within the plate 650 as the plate is lowered and inserted over the bottom of a bottom nozzle 119.

To further facilitate the handling and alignment of the plate 650, a centrally disposed handling collar 666 is provided at the center of the upper surface of the plate 650, and at least two alignment plates 668a and 668b are provided at the bottom surface of this plate. The alignment plates 668a and 668b are registrable with bores that are normally present in the bottom of the bottom nozzle 119 of a fuel rod assembly 110. Once the plate 650 has been placed over the bottom surface of an inverted bottom nozzle 119, the operator merely uses a long-handled Allen wrench to wring the thimble screws through the bores (not shown) that automatically register with the bores 652 when the plate 650 is so positioned.

We claim:

1. A system for repairing and reconstituting fuel assemblies having removable top and bottom nozzles and fuel rods disposed therebetween, comprising:
   (a) an elevator and carriage means for lifting and inverting a pair of fuel assemblies in side-by-side relationship with their bottom nozzles adjacent one another;
   (b) a rod-handling tool having an elongated gripper means at one end for gripping, lifting, lowering and ungripping a fuel rod, and
   (c) a tool positioner detachably mountable over the adjacent bottom ends of the fuel assemblies after the bottom nozzle of each fuel assembly has been removed and said fuel assemblies have been inverted, said positioner having a tool guide for receiving an end of the gripper means of the rod handling tool, said tool guide being movable between selected rod locations in the pair of fuel assemblies.

2. The system of claim 1, wherein both said elevator and carriage means and said rod handling tool are adjustable in length.

3. The system of claim 1, wherein said tool positioner includes first and second slave carriages for moving the tool guide in different directions across the ends of the fuel assemblies.

4. The system of claim 3, wherein said tool positioner further includes a master carriage remotely linked to said first and second slave carriages for controlling the movement of the tool guide.

5. The system of claim 1, wherein said elevator and carriage means includes a pair of adjacent baskets in side-by-side relationship so that the bottom ends of the fuel assemblies are mutually adjacent, a carriage means for lifting and lowering the baskets within the pool, and a basket inverting means including means for rotatably mounting the baskets to the carriage means for selectively inverting the baskets relative to the carriage means.

6. The system of claim 1, wherein said tool guide includes a guide sleeve for receiving and positioning the rod gripper means of the rod handling tool over a selected rod location, and a funnel means connected to the top end of the guide sleeve for leading the rod gripper means into the guide sleeve.

7. A system for repairing and reconstituting fuel assemblies submerged within a spent fuel pool, wherein each assembly includes a square array of fuel rods disposed between a top and a bottom nozzle fuel assembly, comprising:

(a) an elevator and carriage means having a pair of adjacent baskets for containing and supporting a pair of fuel assemblies in side-by-side relationship so that the bottom ends of the fuel assemblies are mutually adjacent, a carriage means for lifting and lowering the baskets within the pool, and a basket inverting means including means for rotatably mounting the baskets to the carriage means for selectively inverting the baskets;

(b) a rod handling tool having a length adjustable housing that includes a gripper means on its distal end and a lift motor means on its proximal end for gripping, lifting, lowering and ungripping a fuel rod, and a linkage for connecting said lift motor means with said gripper means which automatically adjusts its length to accommodate adjustments in the length of the housing, and (c) a tool positioner detachably mountable over the adjacent bottom ends of the fuel assemblies, said positioner having a tool guide for receiving and guiding the gripper means of the rod handling tool, first and second remotely operable slave carriages for moving the tool guide in different directions across the ends of the fuel assemblies, and a master carriage linked to the first and second slave carriages by at least one loop of cable for remotely moving the first and second slave carriages.

* * * * *